United States Patent
Li

(10) Patent No.: US 10,778,665 B2
(45) Date of Patent: *Sep. 15, 2020

(54) SYSTEM AND METHOD FOR MATCHING DYNAMICALLY VALIDATED NETWORK DATA

(71) Applicant: DatingSphere Inc., Irvine, CA (US)

(72) Inventor: Ming J. Li, Santa Ana, CA (US)

(73) Assignee: DATINGSPHERE INC., Irvine, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 15/136,800

(22) Filed: Apr. 22, 2016

(65) Prior Publication Data

US 2016/0314129 A1 Oct. 27, 2016

Related U.S. Application Data

(60) Provisional application No. 62/151,007, filed on Apr. 22, 2015.

(51) Int. Cl.
*H04L 29/06* (2006.01)
*G06Q 50/00* (2012.01)
(Continued)

(52) U.S. Cl.
CPC .......... *H04L 63/08* (2013.01); *G06F 16/9535* (2019.01); *G06Q 50/01* (2013.01); *H04L 63/102* (2013.01); *H04L 67/306* (2013.01)

(58) Field of Classification Search
CPC ............. G06F 17/3053; G06F 16/9535; H04L 63/102; H04L 63/08; H04L 67/42; H04L 67/306; G06Q 50/01
See application file for complete search history.

(56) References Cited

U.S. PATENT DOCUMENTS

| 8,484,186 B1 * | 7/2013 | Kapczynski | G06Q 40/02 707/609 |
| 8,943,047 B1 * | 1/2015 | Carpio | G06Q 10/06 707/723 |

(Continued)

OTHER PUBLICATIONS

U.S. Appl. No. 15/133,159, Final Office Action dated Jul. 25, 2019, 22 pgs.

(Continued)

*Primary Examiner* — Brian J. Gillis
*Assistant Examiner* — Javier O Guzman
(74) *Attorney, Agent, or Firm* — Kwan & Olynick LLP

(57) ABSTRACT

In general, certain embodiments of the present disclosure provide systems and methods for matching dynamically validated network data. In various embodiments, a system is provided comprising a first client device configured to transmit network profile information including validated user data and user preferences corresponding to a first user. A second client device is configured to transmit network profile information including validated user data and user preferences corresponding to a second user. A content server is configured to receive and store the network profile information as deserialized data structures. The content server is further configured to determine a first score based on the user preferences corresponding to the first user and the validated user data corresponding to the second user, a second score based on the user preferences corresponding to the second user and the validated user data corresponding to the first user, and a compatibility rating for the users.

20 Claims, 15 Drawing Sheets

(51) Int. Cl.
*G06F 16/9535* (2019.01)
*H04L 29/08* (2006.01)

(56) References Cited

U.S. PATENT DOCUMENTS

| | | | | |
|---|---|---|---|---|
| 9,483,778 | B2* | 11/2016 | Tuzhilin | G06Q 30/018 |
| 9,754,040 | B2* | 9/2017 | Saha | G06F 16/958 |
| 2005/0198247 | A1 | 9/2005 | Perry et al. | |
| 2009/0119299 | A1* | 5/2009 | Rhodes | G06F 21/554 |
| 2010/0069058 | A1* | 3/2010 | Rothschild | H04W 76/10 |
| | | | | 455/422.1 |
| 2010/0332529 | A1* | 12/2010 | Nayak | G06F 9/54 |
| | | | | 707/770 |
| 2011/0196927 | A1* | 8/2011 | Vance | G06Q 10/107 |
| | | | | 709/204 |
| 2011/0218864 | A1* | 9/2011 | Pentz | G06Q 30/0241 |
| | | | | 705/14.71 |
| 2012/0096088 | A1* | 4/2012 | Fahmy | G06Q 10/10 |
| | | | | 709/204 |
| 2013/0036458 | A1* | 2/2013 | Liberman | H04L 9/3231 |
| | | | | 726/6 |
| 2013/0122936 | A1* | 5/2013 | Hudson | H04W 4/21 |
| | | | | 455/456.3 |
| 2014/0351907 | A1* | 11/2014 | Noble | H04L 63/08 |
| | | | | 726/6 |
| 2015/0199502 | A1* | 7/2015 | Chen | G06F 21/32 |
| | | | | 705/325 |
| 2016/0315944 | A1 | 10/2016 | Li | |

OTHER PUBLICATIONS

U.S. Appl. No. 15/133,159, Non Final Office Action dated Feb. 9, 2018, 17 pgs.
U.S. Appl. No. 15/133,159, Non Final Office Action dated Dec. 19, 2018, 16 pgs.
International Application Serial No. PCT/US2016/29021, International Search report and Written Opinion dated Aug. 18, 2016, 8 pgs.
Int'l Application Serial No. PCT/US2016/29021, Preliminary Report on Patentability dated Nov. 2, 2017, 7 pgs.

* cited by examiner

SYSTEM AND METHOD FOR MATCHING DYNAMICALLY VALIDATED NETWORK DATA

CROSS-REFERENCE TO RELATED APPLICATIONS

This application claims the benefit of prior application U.S. Provisional Application No. 62/151,007, filed Apr. 22, 2015, titled "REVIEW BASED ONLINE DATING VALIDATION AND MATCHING METHOD" by Ming J. Li, which application is herein incorporated by reference in its entirety for all purposes.

TECHNICAL FIELD

The present disclosure relates generally to network data exchange, and more specifically to matching based on validated data.

BACKGROUND

The amount of data and information on the Internet has increased exponentially over the past decade. Since 2011, the overall global population of people using the internet has grown 60 percent, from 2 Billion internet users to more than 3.2 billion people in 2015. By the date of the present disclosure, it has been estimated that about 2.5 Quintillion bytes of data are created on the Internet every day, as the Internet continues to expand and more people are given the opportunity to access the Internet.

With such increased access to massive amounts of data being generated, it is increasingly more difficult to ascertain true and correct information from false information because there are few safeguards in place to ensure that correct data is retrieved by users. Furthermore, there are no reliable and transparent procedures to validate the massive amounts of information located on the Internet. Thus, there is a need for an enhanced system and method to dynamically validate network information and update such information with validated information.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for matching dynamically validated data. According to various embodiments, a system is provided comprising a first client device configured to transmit a first set of data packets over a network. The first client device corresponds to a first user. The first set of data packets include network profile information corresponding to a first network profile of the first user. The first network profile includes validated user data corresponding to the first user and user preferences corresponding to the first user. The system further comprises a second client device configured to transmit a second set of data packets over the network. The second client device corresponds to a second user. The second set of data packets include network profile information corresponding to a second network profile of the second user. The second network profile includes validated user data corresponding to the second user and user preferences corresponding to the second user.

The system further comprises a content server including a processor and memory. The content server is configured to receive the first set of data packets and the second set of data packets. The content server is further configured to store the network profile information corresponding to the first network profile and the second network profile. Each network profile is stored as a deserialized data structure in the content server. Validation information corresponding to the validated user data of the network profile information is received from one or more authorized reviewing client devices corresponding to one or more reviewing users and stored in one or more arrays of corresponding deserialized data structures.

The one or more reviewing client devices are authorized by receiving one or more data packets from the first client device or the second client device, the one or more data packets including identifying information corresponding to the one or more reviewing users. The one or more reviewing client devices are further authorized by authenticating the one or more reviewing users with one or more unique identifiers retrieved from an organizational database, each unique identifier corresponding to a reviewing user, wherein each reviewing user corresponds to a reviewing client device. The one or more reviewing client devices are further authorized by authorizing the one or more reviewing client devices corresponding to the one or more authenticated reviewing users to access network profile information corresponding to a network profile.

User data is validated by receiving, from the one or more authorized reviewing client devices, validation information corresponding to user data of a network profile. User data is further validated by storing the validation information received from each authorized reviewing client device. Validation information corresponding user data of the first network profile is stored as an array of the deserialized data structure corresponding to the first network profile. Validation information corresponding to user data of the second network profile is stored as an array of the deserialized data structure corresponding to the second network profile. User data is further validated by updating each deserialized data structure by aggregating validation information stored in one or more arrays of the same deserialized data structure. User data is further validated by integrating the validated user data of the first network profile with the aggregated validation information stored as an array in the deserialized data structure corresponding to the first network profile, and integrating the validated user data of the second network profile with aggregated validation information stored as an array in the deserialized data structure corresponding to the second network profile.

The content server is further configured to determine a first score between the first network profile and the second network profile based on the user preferences corresponding to the first user and the validated user data corresponding to the second user. The content server is further configured to determine a second score between the first network profile and the second network profile based on the user preferences corresponding to the second user and the validated user data corresponding to the first user. The content server is further configured to determine a compatibility rating for the first network profile and the second network profile. The compatibility rating comprises an average of the first score and the second score. The first network profile and the second network profile are matched if one or more of the following is greater than a predetermined value: the first score, the second score, and the compatibility rating.

Other implementations of this disclosure include corresponding devices, methods, and computer programs, configured to perform the actions of the described system. In yet further implementations, a non-transitory computer readable medium is provided comprising one or more programs configured for execution by a computer system. In some embodiments, the one or more programs include instructions for performing the actions of described systems and methods. These other implementations may each optionally include one or more of the following features.

For instance, a method for matching dynamically validated network data is provided. The method comprises receiving, at a content server, a first set of data packets from a first client device corresponding to a first user. The first client device is configured to transmit the first set of data packets over a network. The first set of data packets includes network profile information corresponding to a first network profile of the first user. The first network profile includes validated user data corresponding to the first user and user preferences corresponding to the first user.

The method further comprises receiving, at the content server, a second set of data packets from a second client device corresponding to a second user. The second client device is configured to transmit the second set of data packets over the network. The second set of data packets includes network profile information corresponding to a second network profile of the second user. The second network profile includes validated user data corresponding to the second user and user preferences corresponding to the second user.

The method further comprises storing the network profile information corresponding to the first network profile and the second network profile at the content server. The network profile information corresponding to each network profile is stored as a deserialized data structure in the content server. Validation information corresponding to the validated user data of the network profile information is received from one or more authorized reviewing client devices corresponding to one or more reviewing users and stored in one or more arrays of corresponding deserialized data structures.

The method further comprises calculating a first score between the first network profile and the second network profile based on the user preferences corresponding to the first user and the validated user data corresponding to the second user. The method further comprises calculating a second score between the first network profile and the second network profile based on the user preferences corresponding to the second user and the validated user data corresponding to the first user. The method further comprises calculating a compatibility rating for the first network profile and the second network profile. The compatibility rating comprises an average of the first score and the second score. The method further comprises matching the first network profile and the second network profile if one or more of the following is greater than a predetermined value: the first score, the second score, and the compatibility rating.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
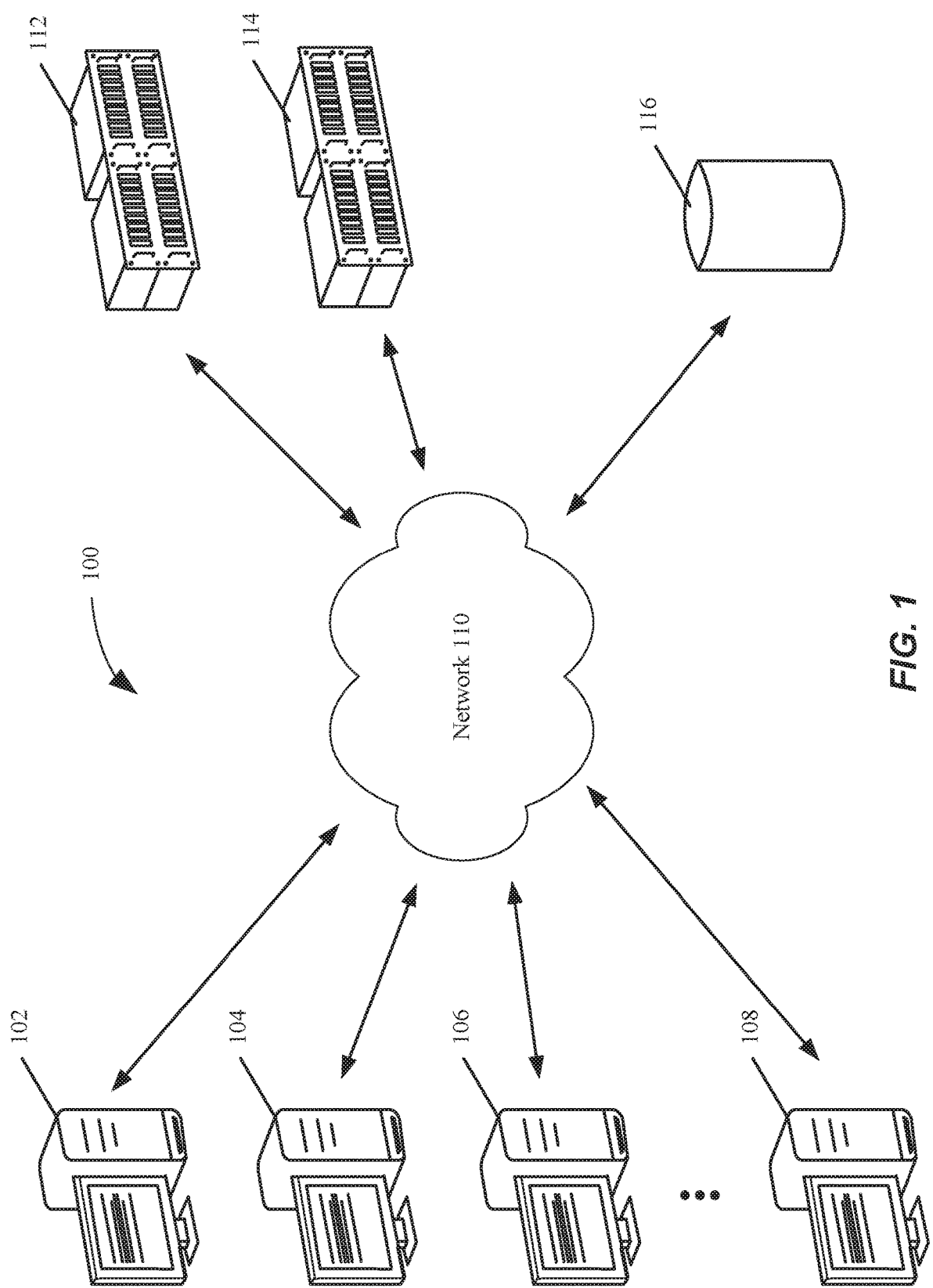
FIG. 1 illustrates a diagram of an example network architecture for implementing various systems and methods of the present disclosure, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular types of data and profile information. However, it should be noted that the techniques of the present disclosure apply to various other types of network information. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a system for dynamic network validation is provided. In various embodiments, the system includes one or more servers, one or more databases, and one or more client devices communicably connected over a network. The one or more client devices include a first client device corresponding to a first user and a second client device corresponding to a second user. In some embodiments, network profile information is stored at a server. In some embodiments, the network profile information is stored as a deserialized data structure. In some embodiments, the network profile information corresponds to a first network profile. In some embodiments, the first network profile is a dating profile of a first user on a social dating network and may include personality information and other personal attributes of the dater. In some embodiments, the first user grants permission to the second user to review and/or validate the network profile information.

Once the second client device is authenticated using various security protocols, the second user is authorized to view the network profile information and transmit validation information. The validation information is stored as an array of the deserialized data structure and the deserialized data structure is updated by aggregating the stored validation information with other previously stored validation information. In some embodiments, a first validated network profile is created by weighting the data of one or more stored validation information and integrating the weighted data based on predetermined protocols and criterion. In some embodiments, the first validated network profile is used to match with a second validated network profile. In further embodiments, only validated network profiles can be matched on the system.

EXAMPLE EMBODIMENTS

FIG. 1 illustrates a diagram of an example network architecture 100 for implementing various systems and methods of the present disclosure, in accordance with one or more embodiments. The network architecture 100 includes a number of client devices 102-108 communicably connected to one or more server systems 112 and 114 by a network 110. In some embodiments, server systems 112 and 114 include one or more processors and memory. The processors of server systems 112 and 114 execute computer instructions (e.g., network computer program code) stored in the memory to perform functions of a network data exchange server.

In some embodiments, server system 112 is a content server configured to receive and store network profile information. In some embodiments server system 114 is a dispatch server configured to transmit and/or route network data packets including network messages. In some embodiments, the network architecture 100 may further include a database 116 communicably connected to client devices 102-108 and server systems 112 and 114 via network 110. In some embodiments, network data, or other information such as user information, may be stored in and/or retrieved from database 116.

Users of the client devices 102-108 access the server system 112 to participate in a network data exchange service. For example, the client devices 102-108 can execute web browser applications that can be used to access the network data exchange service. In another example, the client devices 102-108 can execute software applications that are specific to the network (e.g., networking data exchange "apps" running on smartphones).

Users interacting with the client devices 102-110 can participate in the network data exchange service provided by the server system 112 by distributing digital content, such as text comments (e.g., updates, announcements, replies), digital photos, videos, or other appropriate electronic information. In some implementations, information can be posted on a user's behalf by systems and/or services external to the network or the server system 112. For example, the user may post a review of a movie to a movie review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server system 112 can include one or more computing devices such as a computer server. In some implementations, the server system 112 can represent more than one computing device working together to perform the actions of a server computer (e.g., cloud computing). In some implementations, the network 114 can be a public communication network (e.g., the Internet, cellular data network, dial up modems over a telephone network) or a private communications network (e.g., private LAN, leased lines).

Figure 2A:
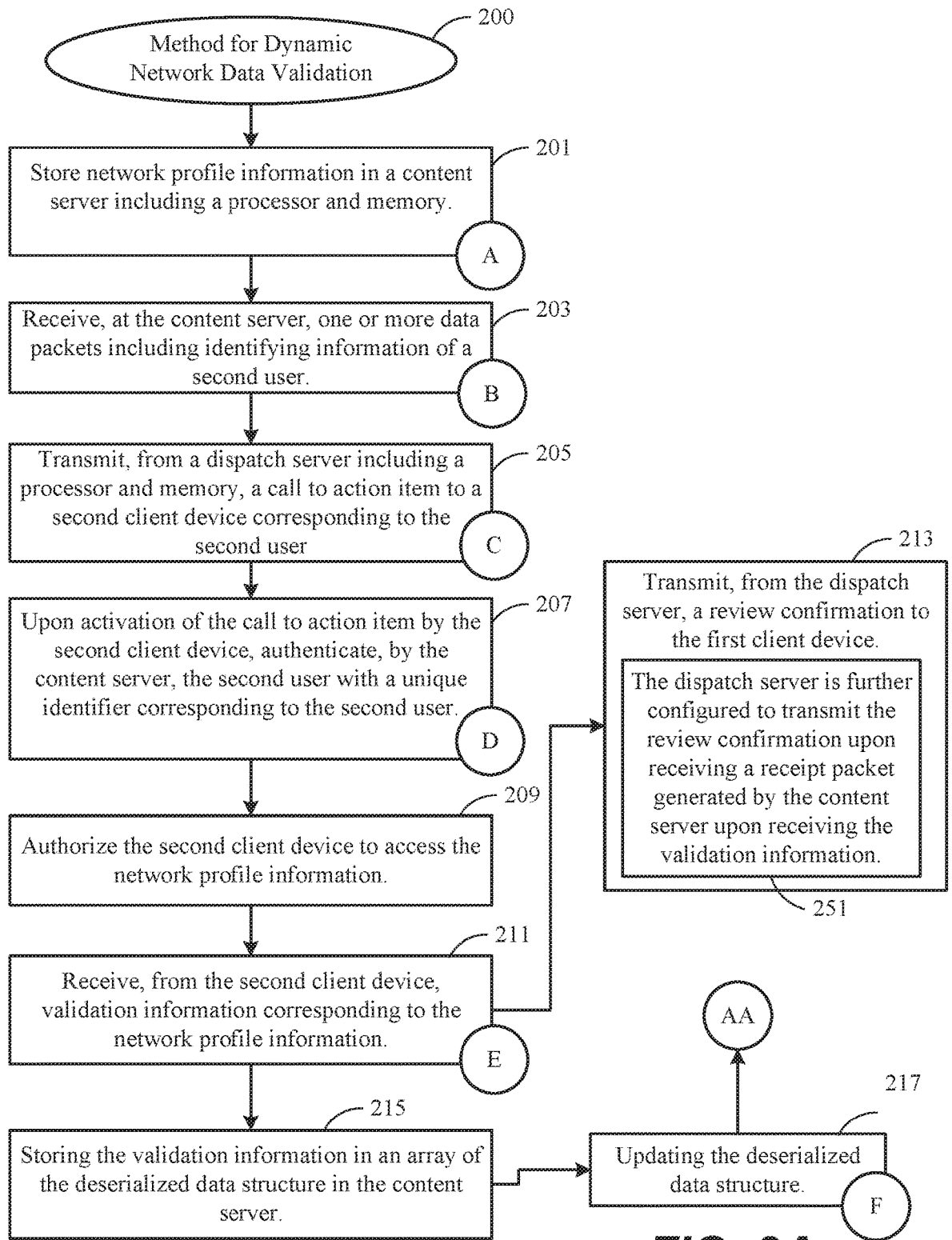
FIGS. 2A, 2B, and 2C illustrate a method for dynamic network data validation, in accordance with one or more embodiments.
Figure 2B:
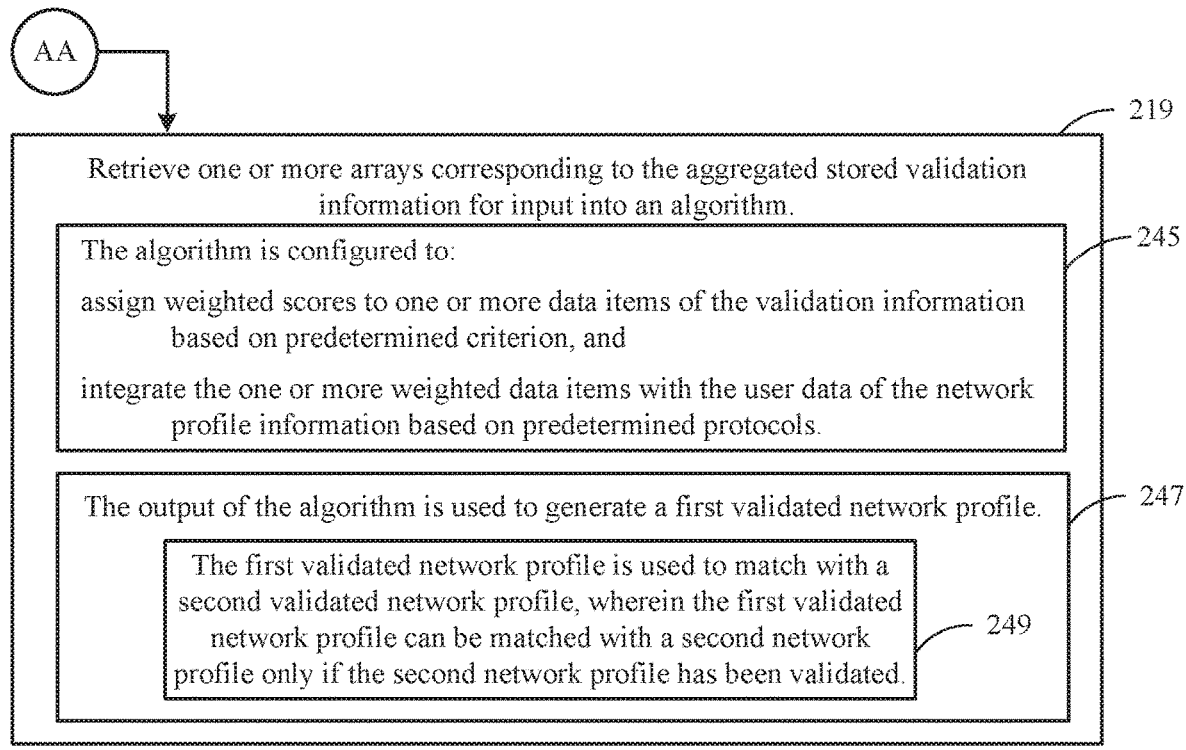
Figure 2B:
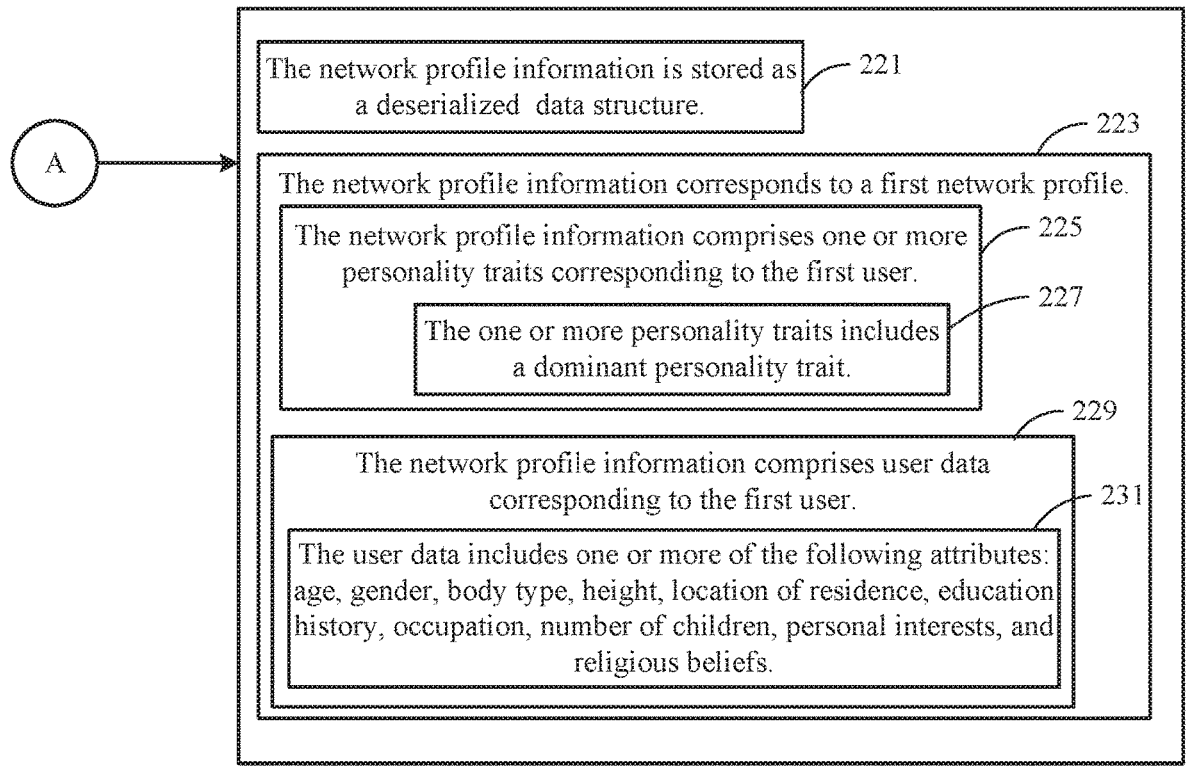
Figure 2C:
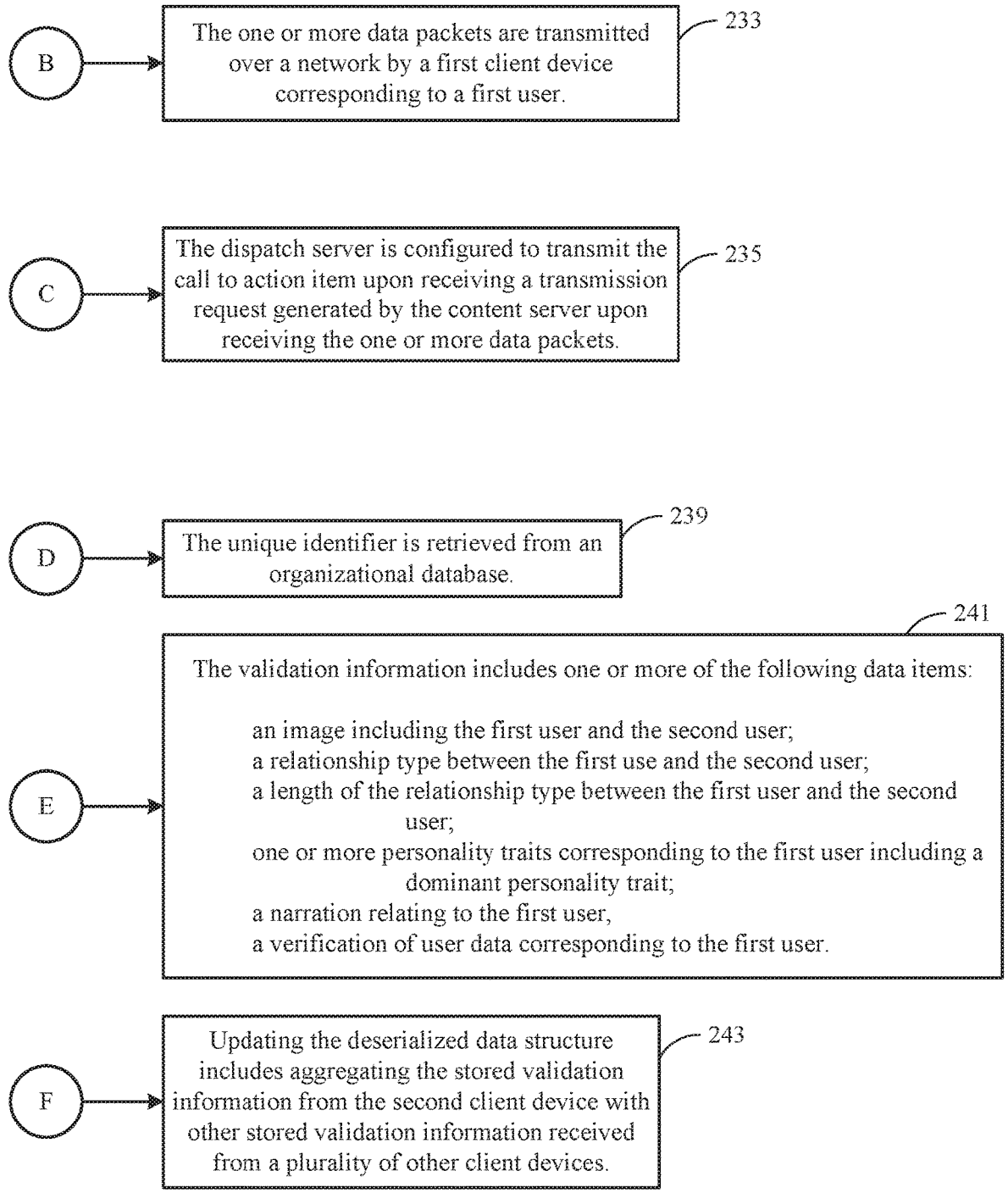

FIG. 2A, FIG. 2B, and FIG. 2C illustrate a method 200 for dynamic network data validation, in accordance with one or more embodiments. At step 201, network profile information 223 is stored in a content server including a processor and memory. In some embodiments, the content server is server 112, previously described in FIG. 1. In some embodiments, the network profile information 223 is stored as a deserialized data structure 221. In some embodiments the deserialized data structure 221 comprises any one of various data structures that provide a means to manage large amounts of data efficiently, such as arrays, associative arrays, trees, records, unions, tagged unions, sets, graphs, trees, classes, etc. Such data structures may be supported by high level assembly languages, such as Microsoft Macro Assembler (MASM), C, and Pascal languages. Other programming languages feature a library mechanism to allow data structures implementations to be reused by different programs, and/or support modular programming. Examples of programming languages include C++ Standard Template Library, Java Collections Framework, and Microsoft's .NET Framework. For example, the network profile information may be stored as a data tree that simulates a hierarchical tree structure, with a root value and subtrees of children with a parent node, represented as a set of linked nodes. In some embodiments, such data tree is formatted to work with JavaScript Object Notation (JSON). In other embodiments, such data tree is formatted to work with other programming languages described above.

In some embodiments, network profile information 223 corresponds to a first network profile. In some embodiments, the first network profile may be a user profile on a social networking service. In some embodiments, the first network profile may be a user profile on a data exchange service. For example, the first network profile may be a user profile included on a professional or business-oriented social network that includes employment history, education, skills, salary, and other related information. In other embodiments, the first network profile corresponds to other types of information besides personal user profiles. For example, the first network profile may be a business profile including information relevant to consumers, such as business hours, services rendered, pricing, photos, etc. As another example, the first network profile is a business profile including information relevant to investors, such as intellectual property owned, capital raised, etc. As another example, the first network profile is a lender and/or borrower profile including information concerning loans, such as interest rates, loan repayment history, etc.

In another example, the first network profile is a user profile of a dater on a social dating network that includes network profile information 223 comprising personality traits, photographs, background information, and other personal attributes. In some embodiments, the network profile is created from data, comprising the network profile information 223, that is entered and/or selected by the dater. In some embodiments, the system implements various protocols to generate the user profile of the dater based on various predetermined criteria, as further described in FIGS. 3A-3B below.

In some embodiments, the network profile information 223 comprises one or more personality traits 225 corresponding to the first user. In some embodiments, the one or more personality traits 225 may include positive personality traits, such as charming, clever, confident, considerate, courteous, curious, decisive, determined, easy-going, elegant, logical, loving, loyal, observant, open-minded, organized, passionate, personable, philosophical, playful, sophisticated, strong, suave, sweet, trusting, understanding, well-rounded, wise, witty, youthful, etc. In some embodiments, the one or more personality traits 225 may additionally, or alternatively, include neutral personality traits such as aggressive, blunt, clumsy, cocky, compassionate, competitive, conservative, demanding, dependent, dramatic, extravagant, frivolous, impulsive, independent, indulgent, opinionated, opportunistic, picky, perfectionist, private, protective, sarcastic, sensitive, serious, stoic, stubborn, wild, etc. In some embodiments, the one or more personality traits 225 may additionally, or alternatively, include other traits, including negative traits. In some embodiments, the one or more personality traits 225 includes a dominant personality trait 227. In some embodiments, the dominant personality trait 227 is selected from one of the one or more personality traits 225.

In some embodiments, the network profile information 223 additionally, or alternatively, comprises user data 229 corresponding to the first user. In some embodiments, the user data 229 includes one or more of the following attributes 231: age, gender, body type, height, location of residence, education history, occupation, number of children, personal interests, and religious beliefs. In other embodiments, other attributes 231 may additionally, or alternatively, be included, such as eye color, hair color, relationship status, salary, smoker/non-smoker, etc. In some embodiments, other attributes 231 may also include user preferences for gender, age, children, smoker/non-smoker, etc.

At step 203, one or more data packets 233 including identifying information of a second user are received at the content server. In some embodiments, the second user is a reviewer of the system. In some embodiments, the identifying information includes the second user's name, user name, email address, etc. In some embodiments, the identifying information includes a type relationship between the first user and the second user. For example, the identifying information may include a selection of family member, friend, or ex (corresponding to ex-boyfriend or ex-girlfriend). In some embodiments, data packets 233 corresponding to a seven-layer Open Systems Interconnection (OSI) model of computer networking and utilize standard protocols such as transmission control protocol (TCP) or user datagram protocol (UDP). In some embodiments, the one or more data packets 233 are transmitted over a network by a first client device corresponding to a first user. In some embodiments, the first user is the dater corresponding to the first network profile. In some embodiments, the network is network 110 and the first client device is a client device from client devices 102-108.

At step 205, a call to action item 235 is transmitted to a second client device from a dispatch server including a processor and memory. The second client device corresponds to the second user. In some embodiments, second client device is a client device, such as client device 102-108. In some embodiments, the dispatch server is server 114, previously described in FIG. 1. In some embodiments, the dispatch server is configured to transmit the call to action item 235 upon receiving a transmission request generated by the content server upon receiving the one or more data packets 233. In some embodiments, the transmission request is transmitted to the dispatch server via one or more data packets, similar to data packets 233, over a network, such as network 110. In some embodiments the call to action item 235 is a message, such as an email, that includes a hyperlink. A hyperlink is a reference to data that the reader can directly follow either by clicking or by hovering. A hyperlink may point to a whole document or to a specific element within a document. In some embodiments, the call to action includes hypertext including the hyperlink. In some embodiments, the call to action item 235 links to the network profile information 223 stored on the content server. In some embodiments, the call to action item 235 includes a prompt to the second user to activate the call to action item 235 via the second client device.

Upon activation of the call to action item 235 by the second client device, the second user is authenticated by the content server at step 207 with a unique identifier 239 corresponding to the second user. In some embodiments, activation of the call to action item 235 causes a log in page to be displayed at the second client device. In some embodiments, the unique identifier 239 is retrieved from an organizational database. In some embodiments, the organizational database is a database of a social networking system. In some embodiments, the unique identifier 239 is retrieved based on the identifying information included in data packets 233. In some embodiments, the log in page is specific to the second user based on the identifying information of the second user. In some embodiments, the second user is authenticated by entering the password corresponding to the unique identifier 239.

At step 209, the second client device is authorized to access the network profile information 223. In some embodiments, the network profile information 223 is displayed at the second client device. At step 211, validation information 241 corresponding to the network profile information 223 is received from the second client device. In some embodiments, the second user is prompted at the second client device to input the validation information 241. In some embodiments, the validation information 241 includes one or more of the following data items: an image including the first user and the second user, a relationship type between the first user and the second user, a length of the relationship type between the first user and the second user, one or more personality traits corresponding to the first user including a dominant personality trait, a narration relating to the first user, and a verification of the user data 229 corresponding to the first user.

In various embodiments, the image of the first user and the second user is a digital image file that is uploaded to the content server. In some embodiments, the image file includes metadata including the date the image was created and/or taken. In some embodiments, the relationship type between the first user and the second user is selected from among the following: friend, family and ex. In some embodiments, ex corresponds to an ex-boyfriend or ex-girlfriend. In some embodiments, the relationship type is preselected by data included in the identifying information of the second user included in data packets 233. In some embodiments, the length of the relationship type indicates how long the second user has known the first user. In some embodiments, the one or more personality traits corresponding to the first user are personality traits selected and/or entered by the second user. In some embodiments, the second user is prompted with a selection of personality traits, such as those previously listed. In other embodiments, the second user may enter descriptive personality traits. In some embodiments, a dominant trait is indicated by the second user from the selected and/or entered personality traits.

In some embodiments, the narration relating to the first user is a personal account and/or personal description of the first user created by the second user. In some embodiments, the narration includes one or more of the selected and/or entered personality traits. For example, the narration may describe how a selected personality trait is exemplified by an action taken by the first user. In some embodiments, the verification of the user data 229 includes a selection of True or False. For example, the user data 229 of the network profile information 223, including attributes 231, may be displayed at the second client device, and the second user is prompted to mark each presented attribute 231 as either True or False.

At step 213, a review confirmation 251 is transmitted to the first client device from the dispatch server. In some embodiments, the review confirmation 251 includes a message indicating that validation information was transmitted from the second client device. In some embodiments, the review confirmation 251 is transmitted via data packets over a network, such as network 110. In some embodiments, the dispatch server is further configured to transmit the review confirmation 251 upon receiving a receipt packet generated by the content server upon receiving the validation information 241. In some embodiments, the receipt packet is transmitted to the dispatch server via data packets from the content server over a network, such as network 110.

At step 215, the validation information 241 is stored in an array of the deserialized data structure 221 in the content server. An array is a data structure consisting of a collection of elements (values or variables), each identified by at least one array index or key. An array is stored so that the position of each element can be computed from its index tuple by a mathematical formula. In the previously described example of a data tree, an array can store the tree's data values efficiently, placing each data value in the array position corresponding to that node's position within the tree.

At step 217, the deserialized data structure 221 is updated. In some embodiments, updating the deserialized data structure 221 includes aggregating the stored validation information 241 from the second client device with other stored validation information 243 received from a plurality of other client devices. In some embodiments, the other stored validation information 243 is similarly stored as an array of the deserialized data structure 221 in the content server. In some embodiments, aggregation of the validation information 241 and other stored validation information 243 increases efficiency in accessing the data therein.

At step 219, one or more arrays corresponding to the aggregated stored validation information 241 are retrieved for input into an algorithm 245. In some embodiments, the algorithm 245 is configured to assign weighted scores to one or more data items of the validation information 241 based on predetermined criterion. In some embodiments, the algorithm 245 is configured to integrate the one or more weighted data items with the user data of the network profile information 223 based on predetermined protocols. In some embodiments, the one or more personality traits 225 and/or user data 229 of network profile information 223 is updated with the one or more weighted data items. In some embodiments, the output of the algorithm 243 is used to generate a first validated network profile 247. In some embodiments, the first validated network profile 247 reflects the updated network profile information. The operations of algorithm 245 are further explained below in conjunction with FIGS. 3A-3B. In some embodiments, information corresponding to the second user is displayed on the validated network profile 247. In some embodiments, such information includes a combination of one or more of the following, an image of the second user, contact information, relationship between the first user and the second user, length of relationship, other data items included in validation information 241, etc.

In some embodiments, the first validated network profile 247 is used to match with a second validated network profile 249. In some embodiments, the first validated network profile 247 can be matched with a second network profile only if the second network profile has been validated. In some embodiments, the second network profile corresponds to another dater of the social dating network. In some embodiments, a matching algorithm is implemented to determine a weighted match score between the first validated network profile 247 and the second validated network profile 249 based on predetermined criterion and/or protocols. In some embodiments, a weighted match score is determined between the first validated network profile 247 and other validated network profiles. In some embodiments, validated network profiles with a weighted match score above a predetermined value is presented to the first user of the system.

Figure 3A:
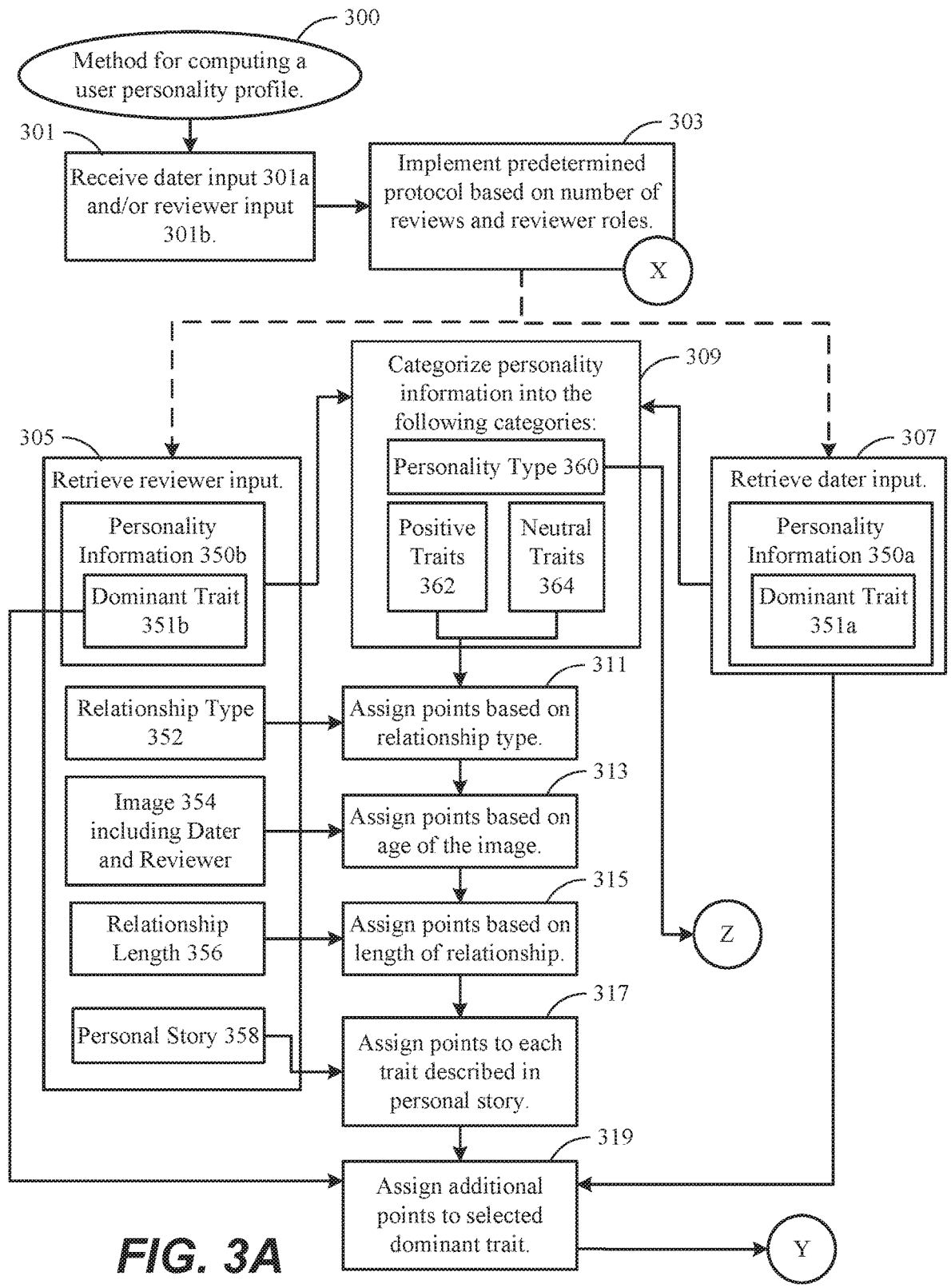
FIGS. 3A and 3B illustrate an example of a method for computing a personality profile, in accordance with one or more embodiments.
Figure 3B:
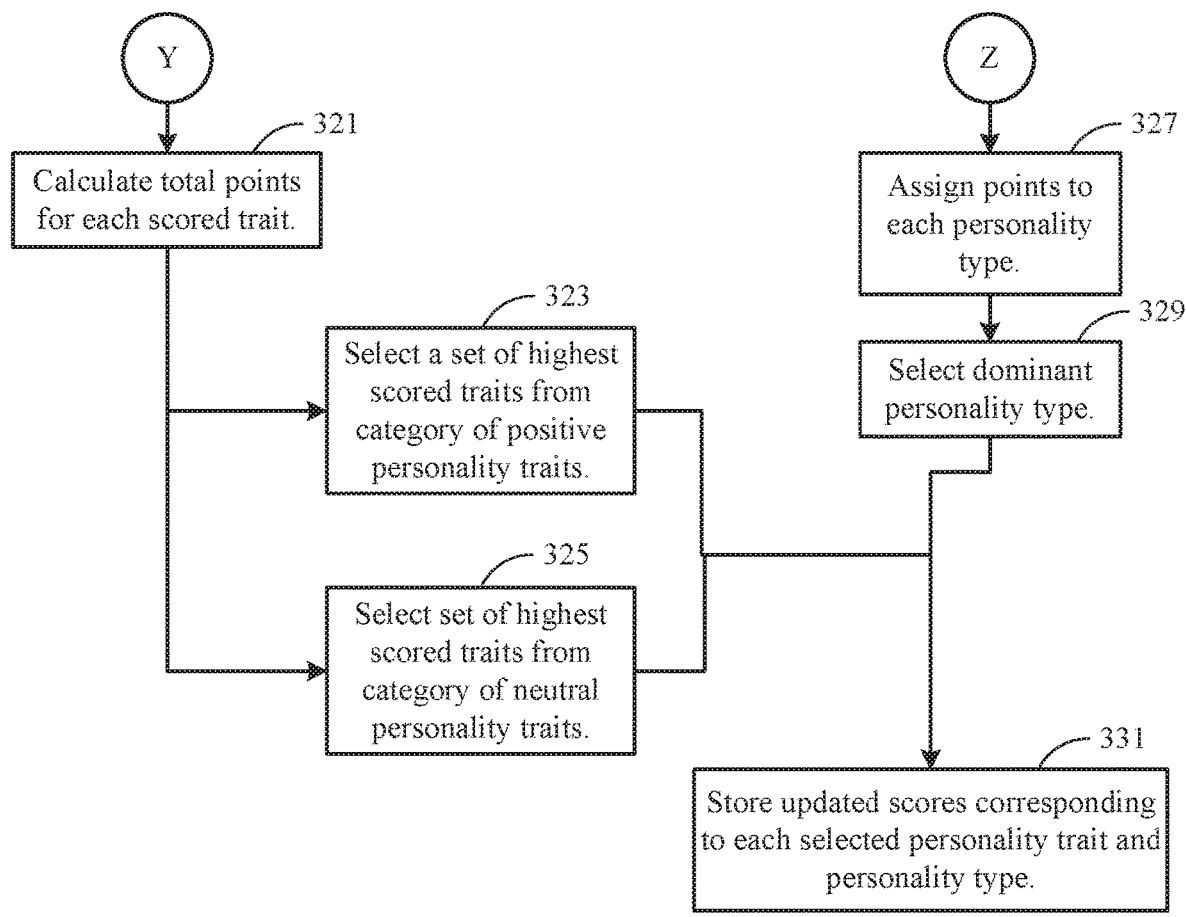
Figure 4A:
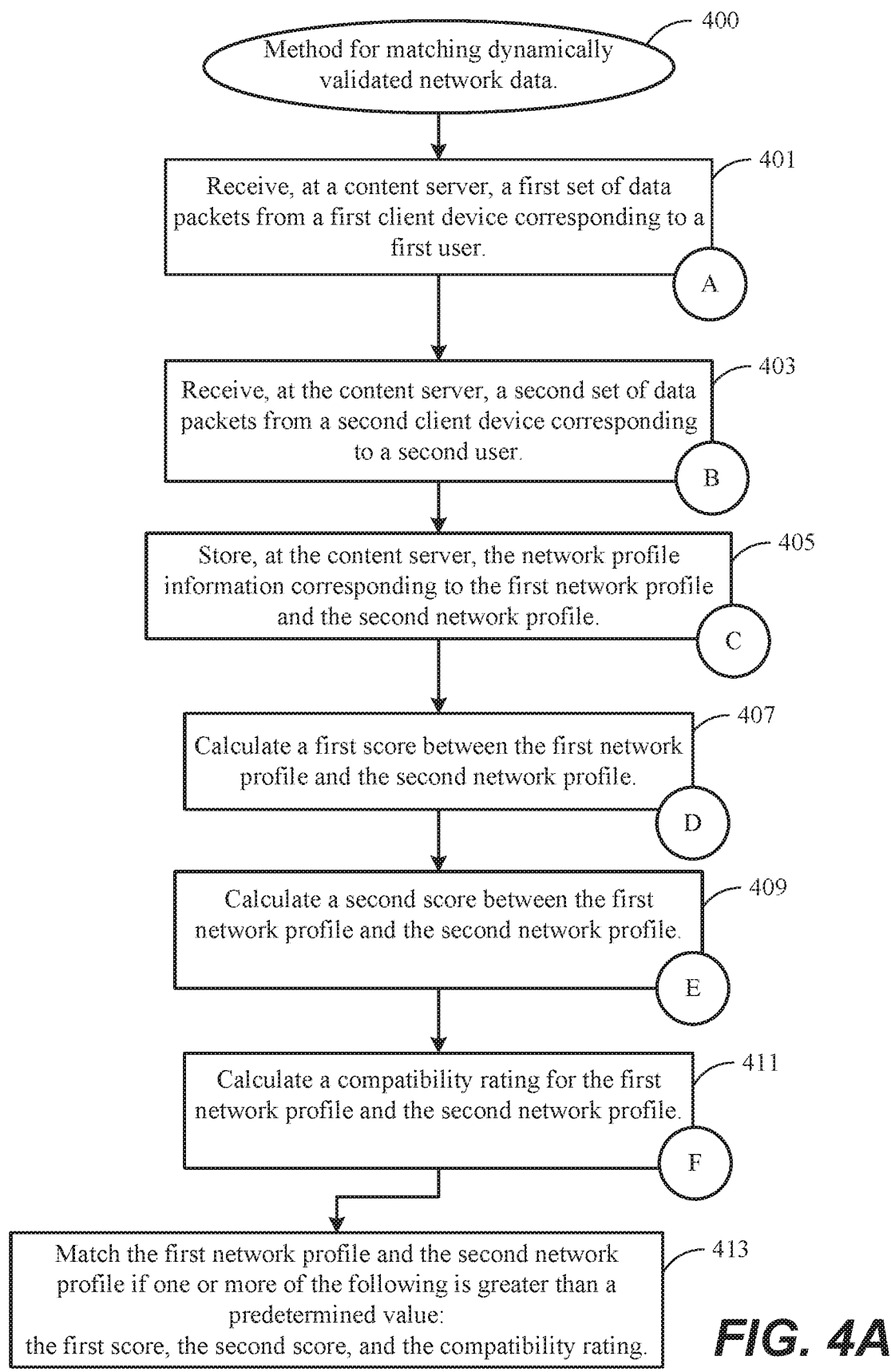
FIGS. 4A, 4B, 4C, 4D, and 4E illustrate an example of a method for matching dynamically validated network data, in accordance with one or more embodiments.
Figure 4B:
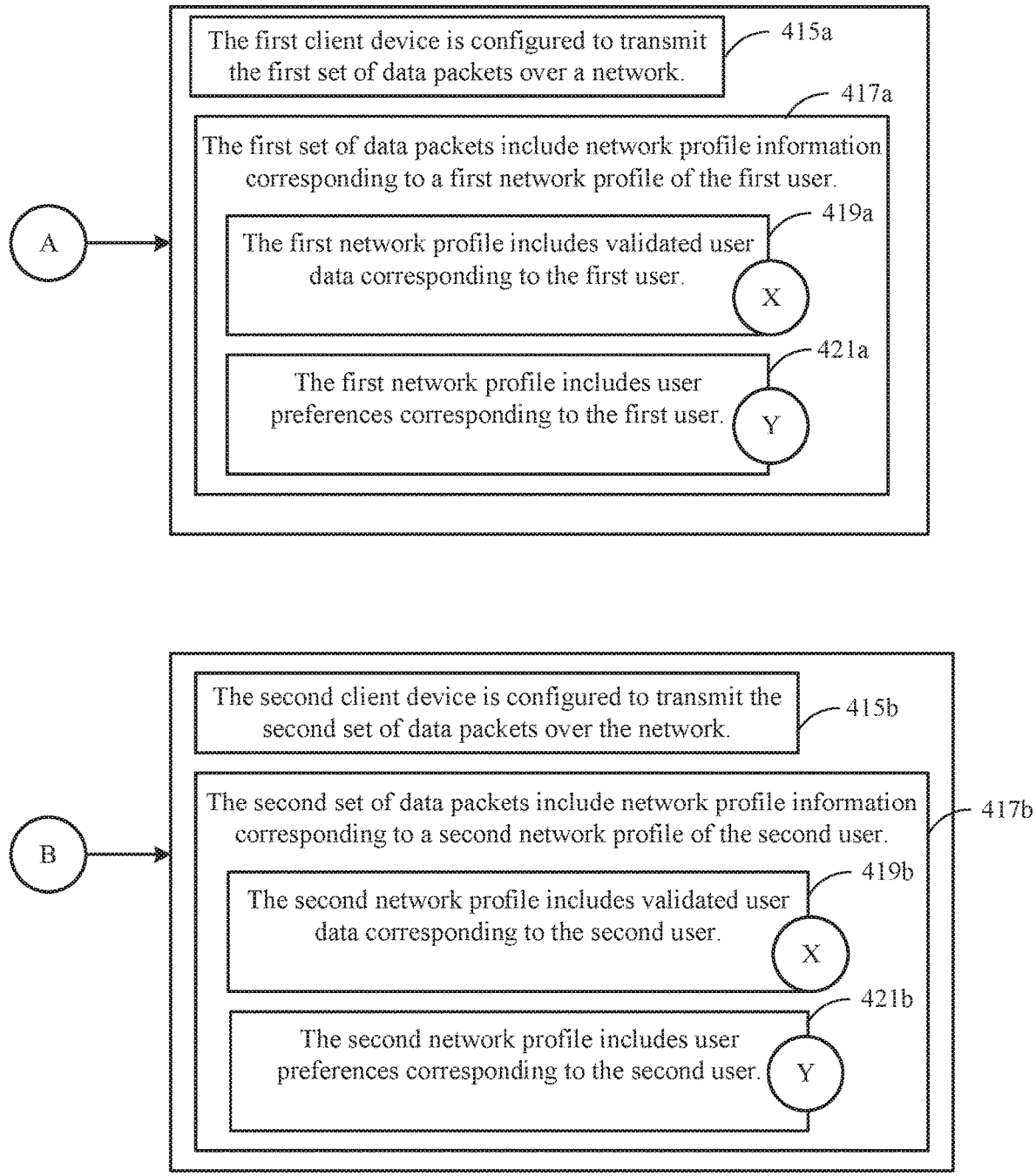
Figure 4C:
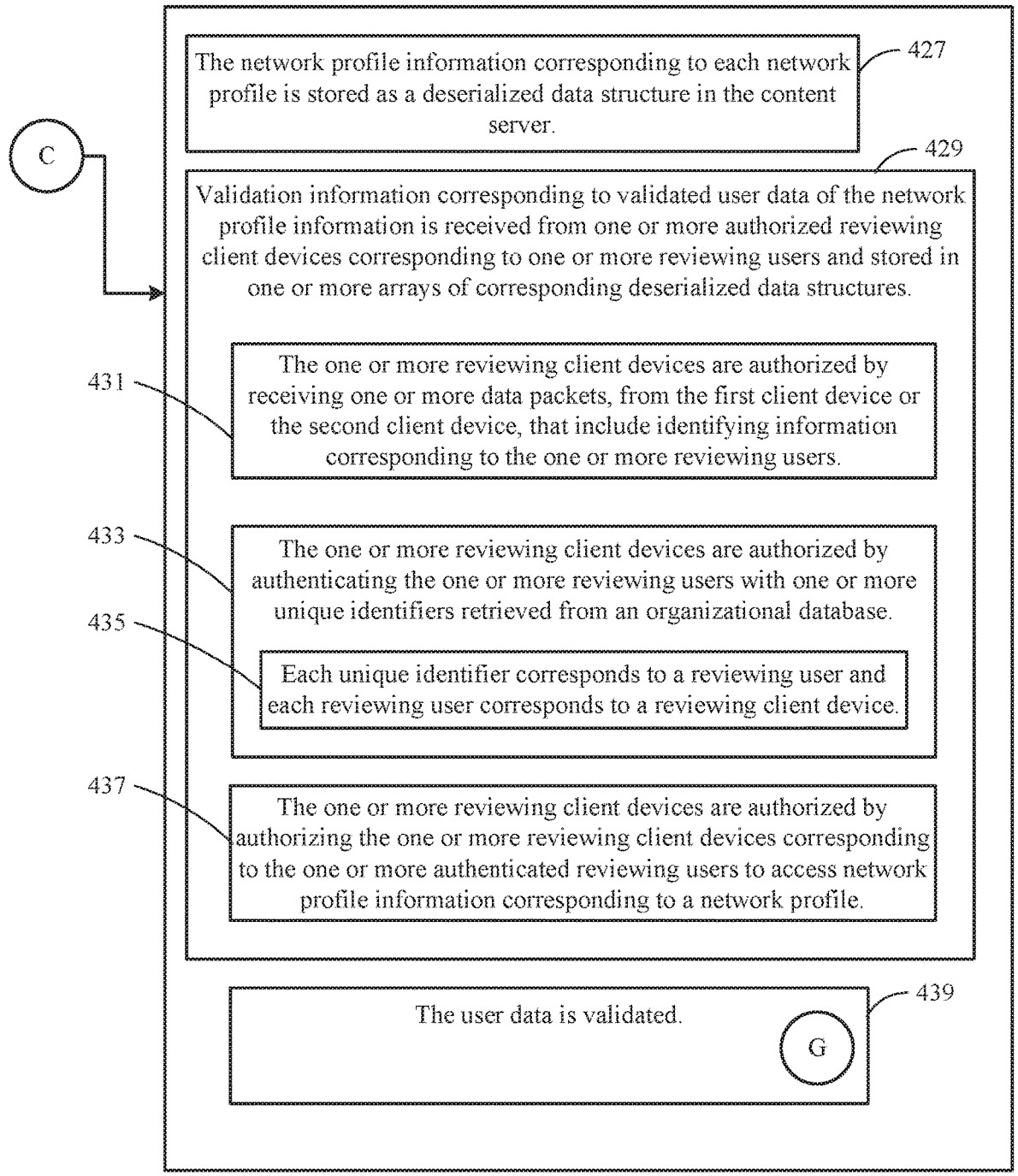
Figure 4D:
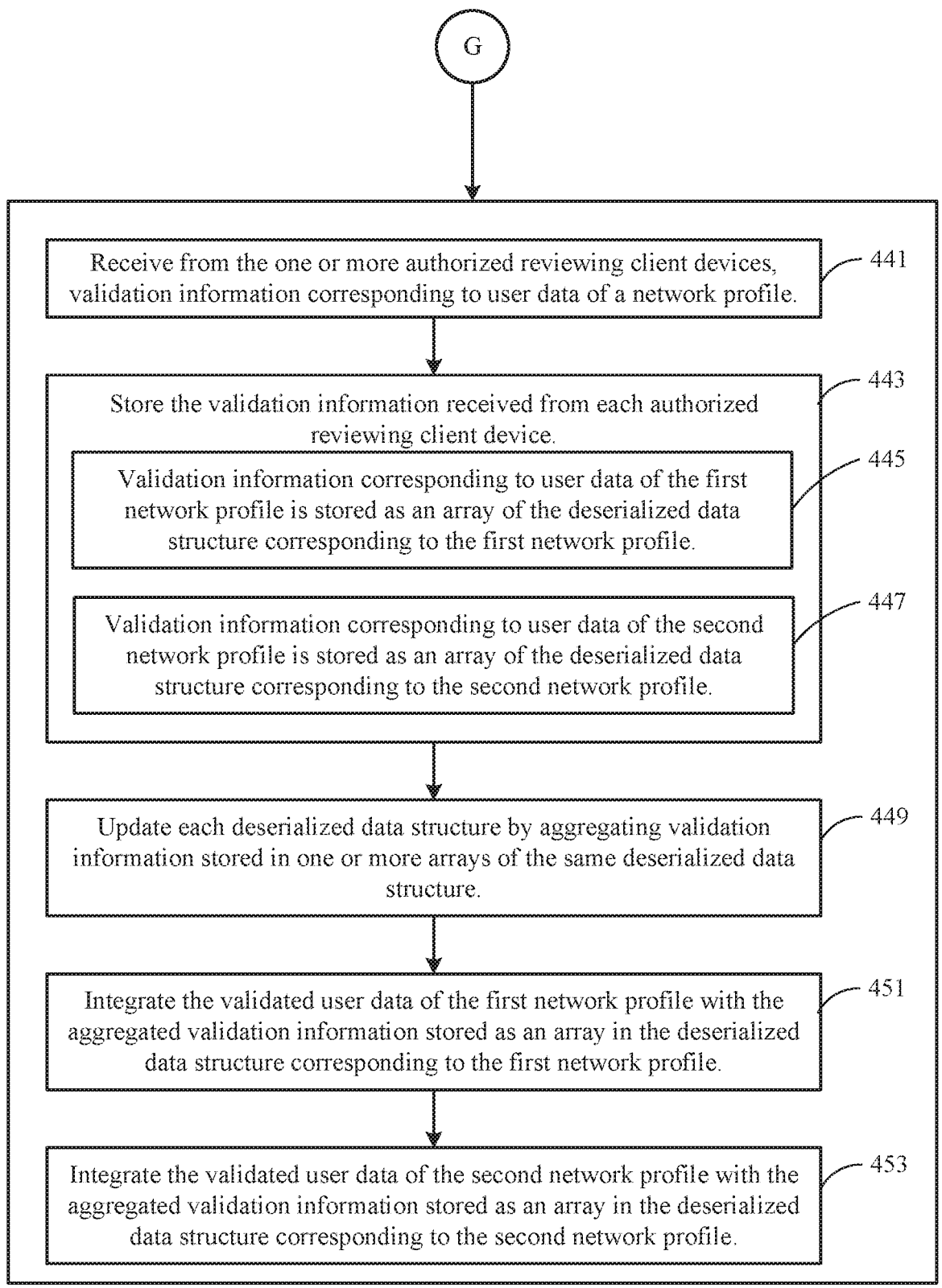
Figure 4E:
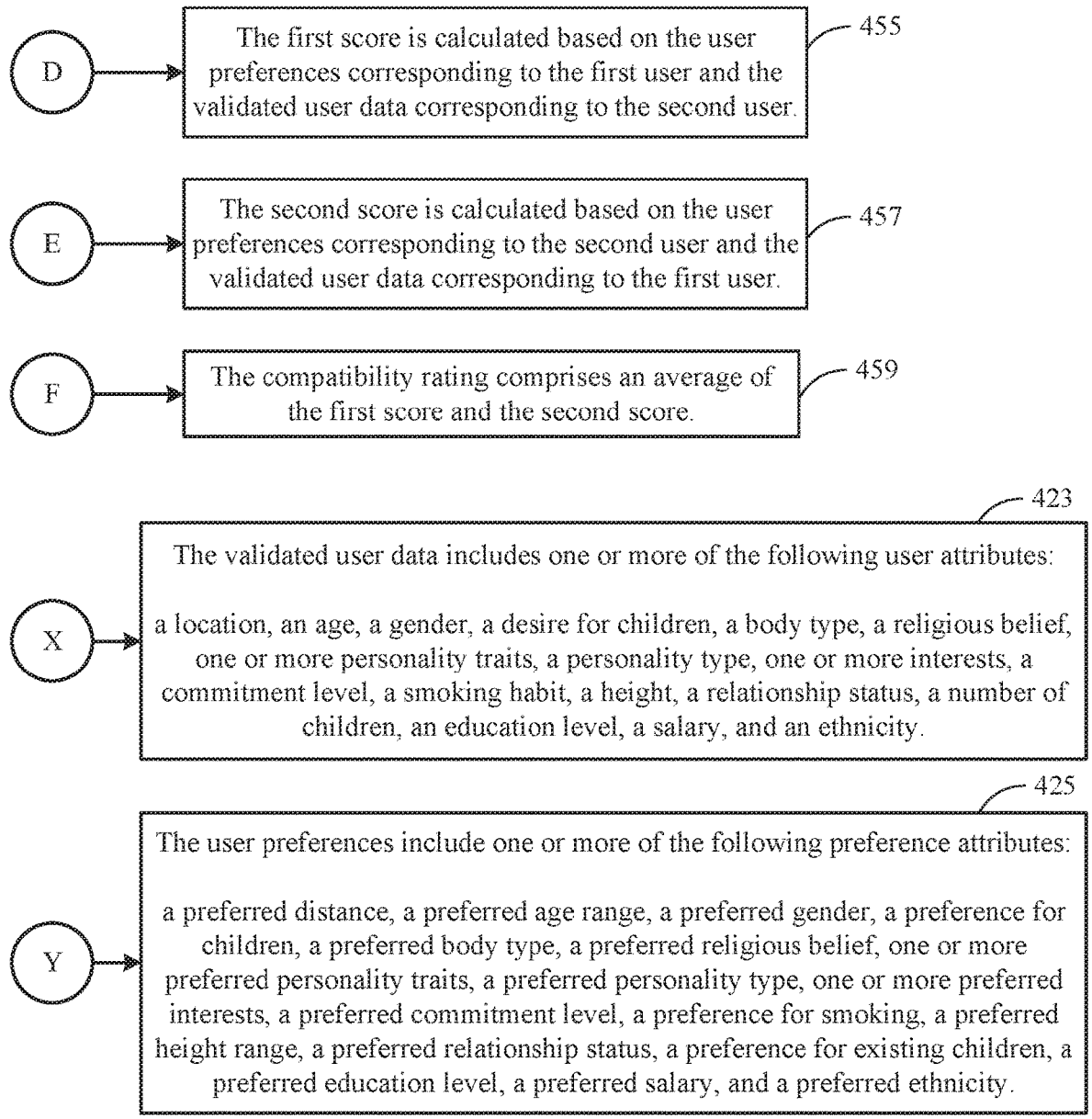

FIG. 3A and FIG. 3B illustrate an example of a method 300 for computing a user personality profile, in accordance with one or more embodiments of the present disclosure. In some embodiments, method 300 is implemented via an algorithm, such as algorithm 245, previously described in FIGS. 2A-2C. At step 301, dater input 301a and/or reviewer input 301b is received.

In various embodiments, the dater is the first user described in FIGS. 2A-2C. In some embodiments, dater input 301a includes network profile information, such as network profile information 223. In some embodiments, dater input 301a includes personality information 350a. In some embodiments personality information 350a includes personality traits, such as personality traits 225. In some embodiments, a personality trait corresponds to a habitual pattern of behavior, temperament, and/or emotion. In some embodiments, personality information 350a additionally, or alternatively, includes a personality type 360 corresponding to the dater. In some embodiments, a personality type corresponds to a collection of personality traits that occur together consistently. In some embodiments, a personality type 360 is a selection between extrovert, ambivert, or introvert. In some embodiments, other personality types 360 are included for selection.

In some embodiments, the personality traits selected by the dater include positive traits 362 and/or neutral traits 364 corresponding to the dater. In some embodiments, personality information 350*a* additionally, or alternatively, includes a dominant trait 351*a*. In some embodiments the dominant personality trait 351*a* is selected by the dater from a personality trait included in personality information 350*a*. As described in FIGS. 2A-2C, a dater is prompted to enter and/or select personality information 350*a*, including personality traits 225, to generate a user profile for a social dating network. In some embodiments, personality information 350*a* additionally includes a dominant personality trait 351*a*, such as dominant personality trait 227. In other embodiments, dater input 301*a* additionally, or alternatively, includes photographs, background information, and other personal attributes. As additionally described in FIGS. 2A-2C, the input received from the dater may be stored as a deserialized data structure 221 on a content server, such as server 112.

In some embodiments, a reviewer is another user of a social dating network. In some embodiments, the reviewer is a second user corresponding to the second client device, as described in FIGS. 2A-2C. As further described in FIGS. 2A-2C, the reviewer is authorized to access the network profile information 223, such as in step 209, and transmit validation information 241 corresponding to the network profile information 223, such as in step 211. In some embodiments, the reviewer input 301*b* is validation information, such as validation information 241, which may include an image including the first user and the second user, a length of relationship between the first user and the second user, a narration relating to the first user, and/or a verification of user data corresponding to the first user. In some embodiments, the reviewer input 301*b* includes personality information 350*b*. In some embodiments, personality information 350*b* includes data items, such as one or more personality traits corresponding to the first user (dater) included in validation information 241. In some embodiments, the one or more personality traits include positive traits 362 and/or neutral traits 364 corresponding to the dater. In some embodiments, personality information 350*b* additionally, or alternatively, includes a personality type 360. In some embodiments, personality information 350*b* additionally includes a dominant personality trait 351*b*. In some embodiments the dominant personality trait 351*b* is selected by the reviewer from a personality trait included in personality information 350*b*. In some embodiments, a dater and/or reviewer is prompted to select a predetermined number of positive traits 362 and neutral traits 364. In other embodiments, a dater and/or reviewer can select any number of positive traits 362 and neutral traits 364.

Reviewer input 301*b* further includes relationship type 352. In some embodiments, relationship type 352 indicates the type of relationship between the reviewer and the dater, such as family, friend, or ex (ex-girlfriend or ex-boyfriend, etc.), etc. Reviewer input 301*b* further includes an image 354 including the dater and the reviewer. In some embodiments, image 354 may include metadata or other input indicating the date the image was taken and/or created. Reviewer input 301*b* further includes the relationship length 356 indicating the length of the relationship type 352 between the reviewer and the dater. Reviewer input 301*b* further includes a personal story 358. In some embodiments, personal story 358 includes a personal narrative corresponding to the dater written by the reviewer, and may include the one or more personality information 350*b*. As additionally described in FIGS. 2A-2C, input received from the reviewer may be stored as an array of the deserialized data structure 221. As additionally described in FIGS. 2A-2C, the input received from the reviewer may be stored as an array of the deserialized data structure 221 on a content server, such as server 112. In some embodiments, reviewer input 301*b* is received from a plurality of reviewers and stored.

For example, dater input 301*a* is received from a dater, Dater A, and from two reviewers, Reviewer A and Reviewer B. Dater A has input two positive trait selections (charming and sweet), two neutral trait selections (competitive and perfectionist), and a personality type (extrovert). Dater A has indicated that Dater A's dominant personality trait is charming. Reviewer A has selected two positive trait selections (charming and determined), two neutral trait selections (private and sarcastic), and a personality type (extrovert). Reviewer A has indicated that Dater A's dominant personality trait is determined. Reviewer A has also indicated that her relationship type 352 to Dater A is a friend for a relationship length 356 of 10 years and 1 month. Reviewer A has uploaded an image 354 of Reviewer A and Dater A taken two years ago. Reviewer A has also included a personal story 358 describing how Dater A is charming. Reviewer B has selected three positive trait selections (charming, wise, and organized), two neutral trait selections (impulsive and sensitive), and a personality type (ambivert). Reviewer B has indicated that Dater A's dominant personality trait is sensitive. Reviewer B has also indicated that his relationship type 352 to Dater A is an ex-boyfriend for a relationship length 356 of 2 years and 6 months. Reviewer B has uploaded an image 354 of Reviewer B and Dater A taken 5 months ago. Reviewer B has not included a personal story 358 describing Dater A At step 303, a predetermined protocol is implemented based on the number of reviews and reviewer roles. In some embodiments, a first protocol is implemented if input from one, or less than one, reviewer is received, and no dater input corresponding to personality traits has been received. Under the first protocol method 300 does not compute dater's personality profile and ends. In some embodiments, a second protocol is implemented if input from one, or less than one, reviewer is received, and dater input corresponding to personality traits has been received. Under the second protocol, method 300 will compute dater's personality profile using only dater input 301*a* and retrieve dater input 301*a* at step 307. In some embodiments, a third protocol is implemented if input from more than one reviewer is received, and no dater input corresponding to personality traits has been received. Under the third protocol, method 300 will compute dater's personality profile using all defined reviewer input 301*b* and retrieve reviewer input 301*b* at step 305. In some embodiments, a fourth protocol is implemented if both input from more than one reviewer is received, and dater input corresponding to personality traits has been received. Under the fourth protocol, the method 300 will compute dater's personality profile using all defined reviewer input 301*b* and user input 301*a*, and retrieve reviewer input 301*b* and user input 301*a* and steps 305 and 307.

Based on the protocol implemented, reviewer input 301*b* is retrieved at step 305 and/or dater input 301*a* is retrieved at step 307. In the example above, the fourth protocol is implemented because dater input 301a was received from a dater, Dater A, and reviewer input 301b was received from two reviewers, Reviewer A and Reviewer B. Thus, reviewer input 301b is retrieved at step 305 and/or dater input 301a is retrieved at step 307. In some embodiments reviewer input 301b and/or dater input 301a is retrieved from storage within memory of a content server, such as the server 112.

Once retrieved, personality information 350a of dater input 301a and/or personality information 350b of reviewer input 301b are categorized at step 309. In some embodiments, the input personality types 360, positive traits 362, and neutral traits 364 are aggregated and grouped. In other embodiments, other categories may be grouped, such as negative traits. In steps 311 to 319, the positive and neutral personality traits are assigned weighted scores, as described in step 219 in FIGS. 2A-2C. Selected personality types 360 are scored in step 327. From the example above, the selected personality traits 360 include extrovert and ambivert. The positive traits 362 include charming, sweet, determined, wise, and organized. The neutral traits 364 include competitive, perfectionist, private, sarcastic, impulsive and sensitive.

At step 311, points are assigned to the positive traits 362 and neutral traits 364 based on relationship type 352. In some embodiments all personality trait selections by a dater is given 1.0 point. In some embodiments, relationship type 352 indicated as family or friend causes 1.0 point to be assigned to the positive traits 362 and neutral traits 364 selected by the reviewer. In some embodiments, a relationship type 352 indicated as ex causes 1.1 points to be assigned to the positive traits 362 and neutral traits 364 selected by the reviewer. In some embodiments, personality traits selected by exes are weighed more to give a higher significance to personality traits selected by reviewers who have previously dated the dater. In other embodiments, various different predetermined scores may be assigned based on relationship type 352. Table 1 shows the points assigned to each selected personality trait at step 311.

TABLE 1

| Positive Trait | Score | Neutral Trait | Score |
|---|---|---|---|
| Charming | 3.1 | Competitive | 1 |
| Sweet | 1 | Perfectionist | 1 |
| Determined | 1 | Private | 1 |
| Wise | 1.1 | Sarcastic | 1 |
| Organized | 1.1 | Impulsive | 1.1 |
|  |  | Sensitive | 1.1 |

In the above example, each trait selected by Dater A is assigned 1.0 point because those traits are selected in dater input 301a. Each trait selected by Reviewer A is assigned 1.0 point because the relationship type is friend. Because Reviewer B is indicated as an ex for relationship type 352, each trait selected by Reviewer B is assigned 1.1 points. Because Dater A, Reviewer A, and Reviewer B have all selected charming as a personality trait, charming is assigned a total of 3.1 points.

At step 313, points are assigned to the positive traits 362 and neutral traits 364 based on the age of image 354. This scoring may be used to signify a higher weight for closeness of relationship between the reviewer and the dater. In some embodiments, 0.05 points are assigned to all selected personality traits if the image 354 was created within one year of the current date. In other embodiments, various different predetermined scores may be assigned based on age of image 354. Table 2 shows the points assigned to each selected personality trait at step 311.

TABLE 2

| Positive Trait | Score | Neutral Trait | Score |
|---|---|---|---|
| Charming | 0.05 | Competitive | 0 |
| Sweet | 0 | Perfectionist | 0 |
| Determined | 0 | Private | 0 |
| Wise | 0.05 | Sarcastic | 0 |
| Organized | 0.05 | Impulsive | 0.05 |
|  |  | Sensitive | 0.05 |

In the example above, scores are assigned based only on images submitted in reviewer input 301b. Both Reviewer A and Reviewer B input images 354. However, only the image 354 input by Reviewer B was taken less than one year ago. Thus, the positive traits 362 and neutral traits 364 selected by Reviewer B are assigned an additional 0.05 points each. All other traits are assigned 0 points.

At step 315, points are assigned to the positive traits 362 and neutral traits 364 based on the relationship length 356. This may be used to signify consistency of personality traits. In some embodiments, 0.05 points are assigned to all selected personality traits for an indicated relationship length 356 of 5 years or greater, but less than 10 years. In some embodiments 0.10 points are assigned to all selected personality traits for an indicated relationship length 356 of 10 years or greater, but less than 25 years. In some embodiments 0.20 points are assigned to all selected personality traits for an indicated relationship length 356 of 25 years or greater. In other embodiments, various different predetermined scores may be assigned based on relationship length 356. Table 3 shows the points assigned to each selected personality trait at step 311.

TABLE 3

| Positive Trait | Score | Neutral Trait | Score |
|---|---|---|---|
| Charming | 0.10 | Competitive | 0 |
| Sweet | 0 | Perfectionist | 0 |
| Determined | 0.10 | Private | 0.10 |
| Wise | 0 | Sarcastic | 0.10 |
| Organized | 0 | Impulsive | 0 |
|  |  | Sensitive | 0 |

In the example above, scores are assigned based only on indicated relationship length 356 in reviewer input 301b. Both Reviewer A and Reviewer B input relationship lengths 356. However, the relationship length 356 indicated by Reviewer B is less than 5 years, thus, traits selected by Reviewer B are not assigned any points. On the other hand, the relationship length 356 indicated by Reviewer A is greater than 10 years, thus, traits selected by Reviewer A are assigned 0.10 points each.

At step 317, points are assigned to the positive traits 362 and neutral traits 364 based on the personal story 358. In some embodiments, each personality trait described and/or mentioned within the personal story 358 is assigned an additional 0.01 points. In other embodiments, various different predetermined scores may be assigned based on personal story 358. Table 4 shows the points assigned to each selected personality trait at step 317.

TABLE 4

| Positive Trait | Score | Neutral Trait | Score |
|---|---|---|---|
| Charming | 0.01 | Competitive | 0 |
| Sweet | 0 | Perfectionist | 0 |
| Determined | 0 | Private | 0 |
| Wise | 0 | Sarcastic | 0 |
| Organized | 0 | Impulsive | 0 |
|  |  | Sensitive | 0 |

In the example above, scores are assigned based only on whether a trait is included in the personal story 358 in reviewer input 301b. Only Reviewer A has a personal story 358 included in reviewer input 301b. Furthermore, the only personality trait included in the Reviewer A's personal story 358 is charming. Thus, 0.01 points is assigned to the personality trait charming.

At step 319, points are assigned to the positive traits 362 and neutral traits 364 based on the selected dominant trait 351a and/or 351b. In some embodiments, 0.25 points are assigned to the personality trait selected as the dominant trait 351a and/or 351b. In other embodiments, various different predetermined scores may be assigned based on the selected dominant trait 351a and/or 351b. Table 5 shows the points assigned to each selected personality trait at step 319.

TABLE 5

| Positive Trait | Score | Neutral Trait | Score |
|---|---|---|---|
| Charming | 0.25 | Competitive | 0 |
| Sweet | 0 | Perfectionist | 0 |
| Determined | 0.25 | Private | 0 |
| Wise | 0 | Sarcastic | 0 |
| Organized | 0 | Impulsive | 0 |
|  |  | Sensitive | 0.25 |

In the example above, scores are assigned based on indicated dominant trait 351a and 351b in user input 301a and reviewer input 301b, respectively. Dater A selected charming as the dominant trait 351a. Reviewer A selected determined as a dominant trait 351b. Reviewer B selected sensitive as a dominant trait 351b. Thus, 0.25 points are assigned to each of charming, determined, and sensitive.

At step 321, the total points for each scored trait are calculated. Table 6 shows the total points calculated each selected personality trait at step 321.

TABLE 6

| Positive Trait | Score | Neutral Trait | Score |
|---|---|---|---|
| Charming | 3.51 | Competitive | 1 |
| Sweet | 1 | Perfectionist | 1 |
| Determined | 1.35 | Private | 1.1 |
| Wise | 1.15 | Sarcastic | 1.1 |
| Organized | 1.15 | Impulsive | 1.15 |
|  |  | Sensitive | 1.35 |

At step 323, a set of the highest scored traits from the category of positive traits 362 is selected. At step 325, a set of the highest scored traits from the category of neutral traits 364 is selected. In some embodiments a set includes a predetermined number of personality traits. In some embodiments, the set of personality traits for positive traits 362 is a different amount than the set of personality traits for neutral traits 264. In other embodiments, the number of traits in a set of positive traits 362 is the same as the number of traits in a set of neutral traits 264. In an example, the system may select the three highest scored positive traits 362 and three highest scored neutral traits. In the above example, the highest scored positive trait 362 is charming, followed by determined. However, both wise and organized are equally scored. Additionally, the highest scored neutral traits 364 is sensitive, followed by impulsive. However, both sarcastic and private are equally scored.

In some embodiments, in order to complete the selection of personality traits at step 323 and/or step 325, a number of sub-protocols are implemented to serve as a tie-breaker in selecting the highest scored personality traits if one or more personality traits are equally scored. In some embodiments, a first sub-protocol allows dater input 350a to override for one or more personality traits that are equally scored. In some embodiments, a second sub-protocol allows reviewer input 350b of the reviewer with the longest indicated relationship length 356 to override for one or more personality traits that are equally scored. If a personality trait is still not able to be selected, the second sub-protocol then allows for reviewer input 350b of the reviewer with the most recent image 354 to override for one or more personality traits that are equally scored. In some embodiments, a third sub-protocol allows for a random personality trait of the equally scored personality traits to be selected. In other embodiments, other sub-protocols are implemented to select from highest scored personality traits that are equally scored.

In some embodiments, the system will iterate and select a set of superior dominants from the positive personality traits category until the total set of (3) is reached for both positive traits 362 and neutral traits 364. In some embodiments, if the total set has not been reached and there are too many highest scored personality traits equally present during the current iteration to fulfill the total set, the first sub-protocol is implemented only if dater input 301a includes the personality trait that is tied. If the dater input 301a is not viable to implement the first sub-protocol, the second sub-protocol is implemented until total set of (3) is reached. If a personality trait cannot be selected with the second sub-protocol, the third sub-protocol is implemented until total set of (3) is reached.

In the above example, both wise and organized were selected by Reviewer B. Thus, neither the first or second sub-protocols will result in a selected positive trait 362. The third sub-protocol is implemented to select a random positive trait 362 from wise and organized. In the above example, both private and sarcastic were selected by Reviewer A. Thus, neither the first or second sub-protocols will result in a selected positive trait 362. The third sub-protocol is implemented to select a random neutral trait 364 from private and sarcastic.

At step 327, the selected personality types 360 are assigned weighted scores. In some embodiments, 1.0 point is assigned to each personality type selected by each dater and reviewer. From the example above, the selected personality traits 360 include extrovert and ambivert. Extrovert was selected twice, once by Dater A and once by Reviewer A, and is assigned two points. Ambivert was selected once by Reviewer B and is assigned one point. At step 329 a dominant personality type is selected. In the above example, the dominant personality type 360 of Dater A is determined to be extrovert.

In some embodiments, in order to complete the selection of personality type 360 at step 329, a fourth sub-protocol is implemented to serve as a tie-breaker in selecting the highest scored personality type 360 if one or more personality types 360 are equally scored. In some embodiments, the fourth sub-protocol allows dater input 350a to override for one or more personality types 360 that are equally scored. For example, if two reviewers had selected extrovert, two other reviewers had selected introvert, and a dater had selected ambivert, the selections of personality type 360 from reviewer input 350b would be tied for extrovert and introvert. In this present example, the fourth sub-protocol would be implemented to allow the dater selection of ambivert in dater input 301a to override the equally scored personality types 360 selected in reviewer input 350b. In other embodiments, other protocols may be implemented to select from highest scored personality types 360 that are equally scored.

In some embodiments, method 300 is implemented each time user input 301a or reviewer input 301b is received at step 301. In some embodiments, reviewer input 301b is received for up to a predetermined number of unique reviewers. For example, reviewer input 301b may be received for up to ten different reviewers.

In some embodiments, a reviewed dating profile corresponding to Dater A, such as validated network profile 247, is generated as described in FIGS. 2A-2C. In some embodiments, the reviewed dating profile displays the selected sets of positive traits 362, neutral traits 364, and personality type 360. Thus in the above example, the reviewed dating profile of Dater A may display the following personality traits charming, determined, organized, sensitive, impulsive, and sarcastic. The reviewed dating profile of Dater A may further display an extrovert personality type. In some embodiments, information corresponding to reviewers is also displayed on the reviewed dating profile. As previously described, such information corresponding to reviewers includes a combination of one or more of the following: an image of the second user, contact information, relationship between the first user and the second user, length of relationship, other data items included in validation information 241, etc. In various embodiments, other methods and/or algorithms may additionally, or alternatively, be implemented to evaluate validation information 241 for integration with network profile information 223.

FIG. 4A, FIG. 4B, FIG. 4C, FIG. 4D, and FIG. 4E illustrate an example of a method 400 for matching dynamically validated network data, in accordance with one or more embodiments. In some embodiments, the dynamically validated network data comprises updated deserialized data structures, such as updated deserialized structures 221 from method 200. In some embodiments, the dynamically validated network data comprises weighted personality traits and/or personality types determined in method 300. In some embodiments, validated network profiles are matched, such as first validated network profile 247 and second validated network profile 249, as described in FIGS. 2A-2C.

At step 401, a first set of data packets are received at a content server from a first client device 415a corresponding to a first user. In some embodiments, the first client device is configured to transmit the first set of data packets over a network, such as network 110. In some embodiments, the first set of data packets include network profile information corresponding to a first network profile 417a of the first user. The first network profile 417a includes validated user data 419a corresponding to the first user. The first network profile 417a further includes user preferences 421a corresponding to the first user. At step 403, a second set of data packets are received at the content server from a second client device 415b corresponding to a second user. In some embodiments, the second client device 415b is configured to transmit the second set of data packets over the network. In some embodiments the second set of data packets include network profile information corresponding to a second network profile 417b of the second user. The second network profile 417b includes validated user data 419b corresponding to the second user. The second network profile 417b further includes user preferences 421b corresponding to the second user. In some embodiments, the first user and the second user are users of a data exchange service, such as the first user in FIGS. 2A-2C, or the dater described in FIGS. 3A-3B. In some embodiments, the network profile information corresponding to the first network profile 417a and the second network profile 417b is network profile information 223 submitted as dater input 301a.

In some embodiments, the validated user data 419a and/or 419b include one or more of the following user attributes 423: a location, an age, a gender, a desire for children, a body type, a religious belief, one or more personality traits, a personality type, one or more interests, a commitment level, a smoking habit, a height, a relationship status, a number of children, an education level, a salary, and an ethnicity. In some embodiments, the personality traits of user attributes 423 are personality traits 225, and the personality type of user attributes 423 is a personality type 360. In some embodiments, other user attributes 423 may additionally, or alternatively, be included, such as occupation, languages spoken, eye color, hair color, importance of sex, etc. In some embodiments, other user attributes 423 may additionally, or alternatively, be included. In some embodiments user data 419a and/or 419b is user data 229, and user attributes 423 are attributes 231.

In some embodiments, the user preferences 421a and/or 421b include one or more of the following preference attributes 425: a preferred distance, a preferred age range, a preferred gender, a preference for children, a preferred body type, a preferred religious belief, one or more preferred personality traits, a preferred personality type, one or more preferred interests, a preferred commitment level, a preference for smoking, a preferred height range, a preferred relationship status, a preference for existing children, a preferred education level, a preferred salary, and a preferred ethnicity. In other embodiments, other preference attributes 425 may additionally, or alternatively, be included.

At step 405, the network profile information corresponding to the first network profile 417a and the second network profile 417b are stored at the content server, such as in step 201. In some embodiments, the network profile information corresponding to each network profile is stored as a deserialized data structure 427 in the content server. In some embodiments, validation information corresponding to validated user data of the network profile information is received from one or more authorized reviewing client devices 429 corresponding to one or more reviewing users, such as in step 211 and stored in one or more arrays of corresponding deserialized data structures 427, such as in step 215.

In some embodiments, the one or more reviewing client devices are authorized to access and validate the network profile information corresponding to the network profiles 417a and/or 417b. In some embodiments, the one or more reviewing client devices 429 are authorized by receiving (431) one or more data packets, from the first client device 415a or the second client device 415b, that include identifying information corresponding to the one or more reviewing users, such as in step 203. In some embodiments, the one or more the one or more reviewing client devices 429 are authorized by authenticating (433) the one or more reviewing users with one or more unique identifiers 435 retrieved from an organizational database, such as in steps 205-207. In some embodiments, each unique identifier 435 corresponds to a reviewing user and each reviewing user corresponds to a reviewing client device 429. In some embodiments, the one or more reviewing client devices 429 are authorized by authorizing (437) the one or more reviewing client devices 429 corresponding to the one or more authenticated reviewing users to access network profile information corresponding to a network profile, such as in step 209.

Once the one or more reviewing client devices have been authorized, the user data is validated (439). In some embodiments, the user data is validated (439) as described in steps 211-217. At step 441 validation information corresponding to user data of a network profile is received from the one or more authorized reviewing client devices 429, such as in step 211. At step 443, the validation information received from each authorized reviewing client device 429 is stored, such as in step 215. In some embodiments, validation information corresponding to user data of the first network profile 417*a* is stored as an array 445 of the deserialized data structure 427 corresponding to the first network profile 417*a*. In some embodiments, validation information corresponding to user data of the second network profile 417*b* is stored as an array 447 of the deserialized data structure 427 corresponding to the second network profile 417*b*.

At step 449, each deserialized data structure 427 is updated by aggregating validation information stored in one or more arrays of the same deserialized data structure 427, such as in step 217. At step 451, the validated user data of the first network profile 417*a* is integrated with the aggregated validation information stored as an array 445 in the deserialized data structure 427 corresponding to the first network profile 417*a*. At step 453, the validated user data of the second network profile 417*b* is integrated with the aggregated validation information stored as an array 447 in the deserialized data structure 427 corresponding to the second network profile 417*b*.

At step 407, a first score 455 is calculated between the first network profile 417*a* and the second network profile 417*b*. In some embodiments, the first score is calculated based on the user preferences 421*a* corresponding to the first user and the validated user data 419*b* corresponding to the second user. At step 409, a second score 457 is calculated between the first network profile 417*a* and the second network profile 417*b*. In some embodiments, the second score is calculated based on the user preferences 421*b* corresponding to the second user and the validated user data 419*a* corresponding to the first user. At step 411, a compatibility rating 459 is calculated for the first network profile 417*a* and the second network profile 417*b*. In some embodiments, the compatibility rating 459 comprises an average of the first score 455 and the second score 457. The calculations for the first score 455, second score 457, and compatibility rating 459 are further discussed in conjunction with FIGS. 5A-5B below. At step 413, the first network profile 417*a* and the second network profile 417*b* are matched if one or more of the following is greater than a predetermined value: the first score 455, the second score 457, and the compatibility rating 459. In some embodiments, the predetermined value is 0.50. In other embodiments, other predetermined values may be used.

Figure 5A:
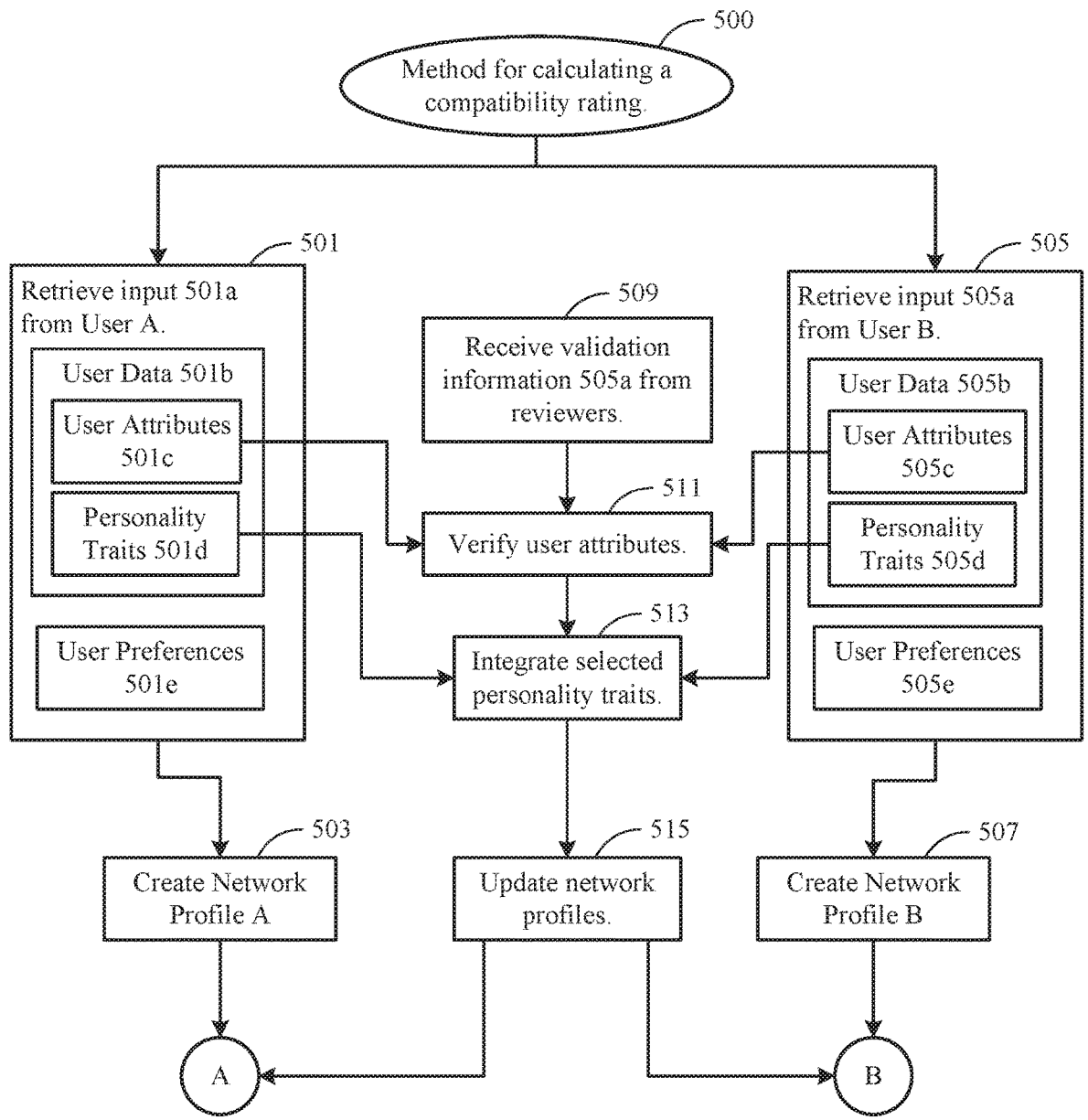
FIGS. 5A and 5B illustrate an example of a method for calculating a compatibility rating, in accordance with one or more embodiments.
Figure 5B:
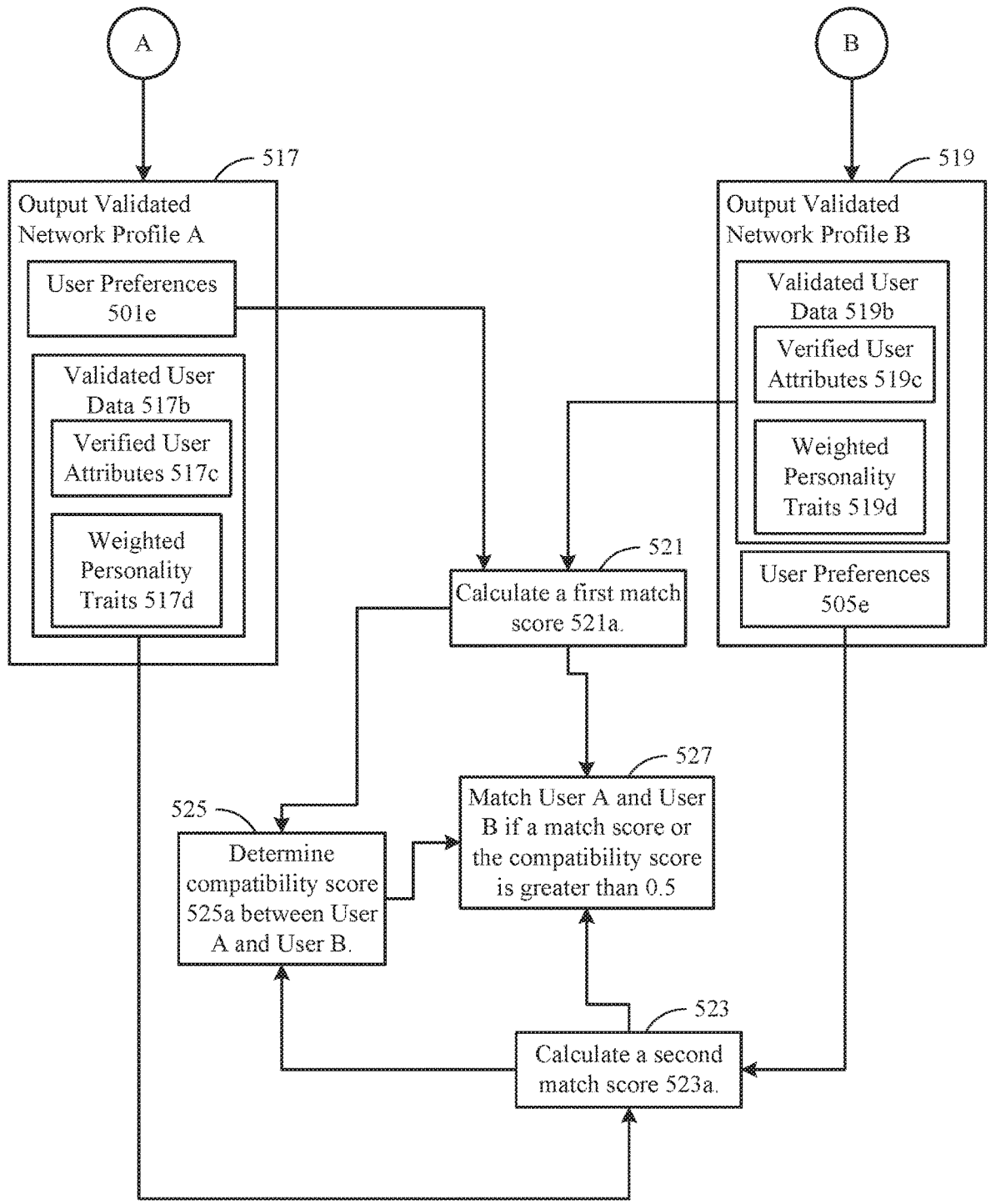

FIG. 5A and FIG. 5B illustrate an example of a method 500 for calculating a compatibility rating, in accordance with one or more embodiments. In some embodiments, method 500 is an algorithm used to output a match score, such as first score 455 and/or second score 457. In some embodiments, method 500 is additionally, or alternatively, used to output a compatibility rating, such as compatibility rating 459.

In some embodiments, User A is the first user as described in FIGS. 4A-4E. In some embodiments, User B is the second user, as described in FIGS. 4A-4E. In some embodiments, User A may be the second user and User B may be the first user. In some embodiments, User A and User B are daters of a social dating network, such as the dater described in FIGS. 3A and 3B

At step 501, input 501*a* from User A is retrieved. At step 505, input 505*a* from User B is retrieved. In some embodiments, input 501*a* and 505*a* is dater input 301*a* received at step 301. In some embodiments, input 501*a* and/or 501*b* comprise network profile information, such as network profile information 223. As previously described, network profile information 223 may be stored as deserialized data structures in a content server, such as in step 201. In such embodiments, input 501*a* and/or 501*b* is retrieved from the memory of the content server. In other embodiments, input 501*a* and/or 505*a* is received directly from a client device, such as client devices 102-108.

In some embodiments, input 501*a* includes user data 501*b* corresponding to User A comprising user attributes 501*c* and personality traits 501*d*. In some embodiments, input 505*a* includes user data 505*b* corresponding to User B comprising user attributes 505*c* and personality traits 505*d*. In some embodiments, user data 501*b* and/or 505*b* is user data 229. In some embodiments, user attributes 501*c* and 505*c* are attributes corresponding to the users, such as attributes 231 or user attributes 423. In some embodiments, attributes 501*c* and/or 505*c* include a location, an age, a gender, a desire for children, a body type, a religious belief, one or more personality traits, a personality type, one or more interests, a commitment level, a smoking habit, a height, a relationship status, a number of children, an education level, a salary, and an ethnicity. In other embodiments, other attributes 501*c* and/or 505*c* are additionally, or alternatively, included. As an example, Table 7 shows the user attributes 501*c* and 505*c* selected by User A and User B, respectively.

TABLE 7

| Attributes | User A input | User B input |
| --- | --- | --- |
| Location | Los Angeles, CA | Pasadena, CA |
| Age | 38 years | 26 years |
| Gender | Male | Female |
| Desire for children | Yes | Yes |
| Body type | Athletic | Thin |
| Religious beliefs | Atheist | Christian |
| Interests | Animals, Beach, Writing | Religion, Shopping, Traveling |
| Commitment level | Serious | Dating |
| Smoking Habit | Smoker | Non-smoker |
| Height | 5'9" | 5'7" |
| Relationship status | Never married | Divorced |
| Number of children | 0 | 1 |
| Education level | Graduate school | College degree |
| Salary | $80,000 | $100,000 |
| Ethnicity | Asian | Caucasian |

In some embodiments personality traits 501*d* and/or 505*d* are personality traits 225. In some embodiments, personality traits 501*d* and/or 505*d* comprise personality traits, such as personality traits included in personality information 350*a*. In some embodiments, personality traits 501*d* and/or 505*d* include positive traits 362 and/or neutral traits 364. In some embodiments, personality traits 501*d* and/or 505*d* include negative traits. In some embodiments, input 501*a* and/or 505*a* additionally include personality type, such as personality type 360, corresponding to User A and/or User B, respectively. For example, input 501a and 505a may include a selection of four positive traits, two neutral traits, and a personality type.

In some embodiments, input 501a further includes user preferences 501e corresponding to User A. In some embodiments, input 505a further includes user preferences 505e corresponding to User B. In some embodiments, user preferences 501e and 505e correspond to desired traits and/or attributes that a user is seeking in another user. In some embodiments, user preferences 501e and 505e are user preferences 421a and/or 421b in FIGS. 4A-4E. In some embodiments, user preferences 501e and/or 505e include: a preferred distance, a preferred age range, a preferred gender, a preference for children, a preferred body type, a preferred religious belief, one or more preferred personality traits, a preferred personality type, one or more preferred interests, a preferred commitment level, a preference for smoking, a preferred height range, a preferred relationship status, a preference for existing children, a preferred education level, a preferred salary, and a preferred ethnicity. In some embodiments, multiple preferred attributes may be selected in each user preference category. As an example, Table 8 shows the user preferences 501e and 505e selected by User A and User B, respectively.

TABLE 8

| User preferences | User A input | User B input |
|---|---|---|
| Preferred distance | 30 miles | 50 miles |
| Preferred age range | 25-31 years | 30-40 years |
| Preferred gender | Female | Male |
| Preference for children | Yes | Yes |
| Preferred body type | Thin, Athletic, Average | Thin, Average, Athletic |
| Preferred religious beliefs | No preference | Christian, atheist |
| Preferred personality traits | Sexual, Strong, Trusting, Understanding, Sensitive, Protective | Generous, Righteous, Romantic, Scrupulous, Frivolous, Impulsive |
| Preferred personality type | Extrovert | Ambivert, Extrovert |
| Preferred interests | Animals, Beach, Writing | Religion, Shopping, Traveling |
| Preferred commitment level | No preference | Serious |
| Preference for smoking | No preference | No preference |
| Preferred height range | 5'4"-5'8" | 5'10"-6'3" |
| Preferred relationship status | Single | No preference |
| Preference for existing children | No | No |
| Education level | High school | College degree |
| Salary | $75,000-$149,999 | $75,000-$149,999 |
| Ethnicity | Asian, Caucasian | Caucasian, African Descent |

Once retrieved, a Network Profile A is created at step 503 from input 501a. In some embodiments, user data 501b is displayed on Network Profile A and is visible to other users of the system. In other embodiments, user preferences 501e are also displayed on Network Profile A. Once retrieved, a Network Profile B is created at step 507 from input 505a. In some embodiments, user data 505b is displayed on Network Profile B and is visible to other users of the system. In other embodiments, user preferences 505e are also displayed on Network Profile B.

At step 509, validation information 509a is received from one or more reviewers. In some embodiments, the reviewers are other users of the system, such as the second user, described in FIGS. 2A-2C, or the reviewer described in FIGS. 3A-3B. In some embodiments, validation information 509a is validation information 241 and/or reviewer input 301b. As previously described, in some embodiments, validation information 509a includes personality information, a relationship type between the reviewer and the dater, the length of the relationship type, images of the reviewer and the dater, and a personal narration. In some embodiments, validation information 509a additionally, or alternatively, includes verification information corresponding to user data 501b and/or 505b.

At step 511, user attributes 501c and/or 505c are verified. In some embodiments, the user attributes 501c and/or 505c are verified by the verification information included in validation information 509a. In some embodiments, the verification information is a confirmation of the user attributes 501c and/or 505c. In some embodiments, verification of user attributes at step 511 results in verified user attributes, such as verified user attributes 517c and/or 519c. For example, a reviewer may be authenticated and authorized to access the network profile information of a dater, such as User A, and view the user attributes 501c input by User A. The reviewer can then assign a True or False value to the user attributes 501c. A True value may cause the attribute to appear as verified. A False value may cause the attribute to appear as unverified. In some embodiments, an attribute of user attributes 501c and/or 505c must be verified by a predetermined number of reviewers before such attribute will appear as verified. The seven attributes most commonly misrepresented are: Age, Body Type, Height, Education, Occupation, Number of Children, and Smoking Habit. In some embodiments, if all seven of such attributes are verified by a reviewer, the network profile of the dater will be marked as verified. In some embodiments, the seven such attributes must be verified by a predetermined number of reviewers before the network profile will be marked as verified. In some embodiments, a reviewer can input a different attribute in addition to marking an attribute as False.

At step 513, personality traits selected by the one or more reviewers are integrated with personality traits 501d and/or 505d selected by User A and/or User B, respectively. In some embodiments, personality traits selected by the one or more reviewers comprise personality traits, such as personality traits included in personality information 350b. In some embodiments, personality traits selected by the one or more reviewers include positive traits 362 and/or neutral traits 364. In some embodiments, personality traits selected by the one or more reviewers include negative traits. In some embodiments, validation information 505a includes a selected personality type, such as personality type 360, corresponding to User A and/or User B. In some embodiments, the personality traits selected by the one or more reviewers are integrated with personality traits selected by a dater, such as User A, by an algorithm, such as in method 300. In some embodiments, integrating the personality traits determines the highest weighted personality traits to result in validated personality traits and/or personality types which may be displayed on the validated network profile. In some embodiments, integration of selected personality traits at step 513 results in weighted personality traits, such as weighted personality traits 517d and/or 519d.

At step 515, network profiles, such as Network Profile A and Network Profile B, are updated. In some embodiments, the network profiles are updated with the verification information and weighted personality traits. In some embodiments, updating network profiles at step 515 results in the output of Validated Network Profile A at step 517 and Validated Network Profile B at step 519. In some embodiments, Validated Network Profile A includes validated user data 517b comprising verified user attributes 517c and weighted personality traits 517d. In some embodiments, Validated Network Profile A also includes user preferences 501e. In some embodiments, Validated network Profile B includes validated user data 519b comprising verified user attributes 519c and weighted personality traits 519d.

According to various embodiments, validated network profiles, such as Validated Network Profile A and Validated Network Profile B, are matched. In some embodiments, only network profiles that are validated can be matched. At step 521, a first match score 521a is calculated. At step 523, a second match score 523a is calculated. In some embodiments, the first match score 521a is calculated based on the user preferences 501e of User A and the validated user data 519b of User B. In some embodiments, the second match score 523a is calculated based on the user preferences 505e of User B and the validated user data 517b of User A. In some embodiments, the first match score 521a and second match score 523a are calculated based on a 100 point total to reach a match percentage. Table 9 shows an example of a calculation of a first match score 521a based on user preferences 501e of User A and the validated user data 519b of User B.

For example, points may be awarded for weighted personality traits 519d of User B that correspond to preferred personality traits in user preferences 501e of User A. Points may also be awarded for weighted personality traits 517d of User A that correspond to preferred personality traits in user preferences 505e of User B. In some embodiments, 20 points are awarded for 3 or more out of 7 corresponding weighted personality traits 517d and/or 519d, 15 points are awarded for 2 out of 7 corresponding weighted personality traits 517d and/or 519d, and 12 points are awarded for 1 out of 7 corresponding weighted personality traits 517d and/or 519d.

Furthermore, other points may be awarded for other attributes of one user corresponding to the user preferences of the other user. For example, 10 points may be awarded for interests of one user corresponding to preferred interests of the other user. In some embodiments, 15 points are awarded for 3 out of 3 corresponding interests, 13 points are awarded for 2 out of 3 corresponding interests, and 10 points are awarded for 1 out of 3 corresponding interests. 10 points may be awarded for a commitment level corresponding to a preferred commitment level. 10 points may be awarded for a smoking habit corresponding to a preference for smoking. 7 points may be awarded for a height attribute corresponding to a preferred height range. 5 points may be awarded based on number of children corresponding to preference for children. 5 points may be awarded based on an education level corresponding to a preferred education level. 3 points may be awarded for a salary corresponding to a preferred salary range. 3 points may be awarded for an ethnicity corresponding to a preferred ethnicity. In various embodiments, 1 to 17 makeup points may be awarded for certain user attributes that do not necessarily match a user preference, but meet the requirements for such user preference. For example, 3 points may be awarded for each personality trait and/or personality type that corresponds to preferred personality traits beyond the 3 out of 7. In some embodiments, makeup points may additionally, or alternatively, be awarded to salaries greater than a preferred salary range. In various embodiments, the first match score 521a and second match score 523a is the percentage of the total points awarded out of 100 base points.

In some embodiments, a match will automatically not occur if certain user attributes do not correspond to user preferences, regardless of match score. For example, if any of user attributes 501c or 505c do not correspond with user preferences 505e and 501e pertaining to distance, age range, gender, preference for children, body type, and/or religious beliefs, then the system will automatically not match the users. In other embodiments, other user preferences 501e and/or 505e may determine automatic failure to match.

In other embodiments, particular overrides are implemented to guarantee a baseline score regardless of the determined match score. For example, if 6 out of 7 weighted personality traits and/or personality types of User A correspond with the user preferences User B, then an 80% minimum score is assigned between the profiles. As another example, if 7 out of 7 weighted personality traits and/or personality types of User A correspond with the user preferences User B, then a 90% minimum score is assigned between the profiles.

At step 525, a compatibility score 525a between User A and User B is determined. In some embodiments, the compatibility score 525a is calculated by averaging the first match score 521a and the second match score 523a. At step 527, User A and User B are matched if the first match score 521a, the second match score 523a, and/or the compatibility score 525a is greater than 0.5. In some embodiments, a different predetermined value other than 0.5 may be used to determine a match. In other embodiments, more than one score and/or rating must be greater than the predetermined value for a match to be assigned. In some embodiments, method 500 is repeated until match scores for all user profiles stored in the content server have been calculated, or until a set of 20 matches have been achieved. In some embodiments, method 500 is implemented for every new user.

Figure 6:
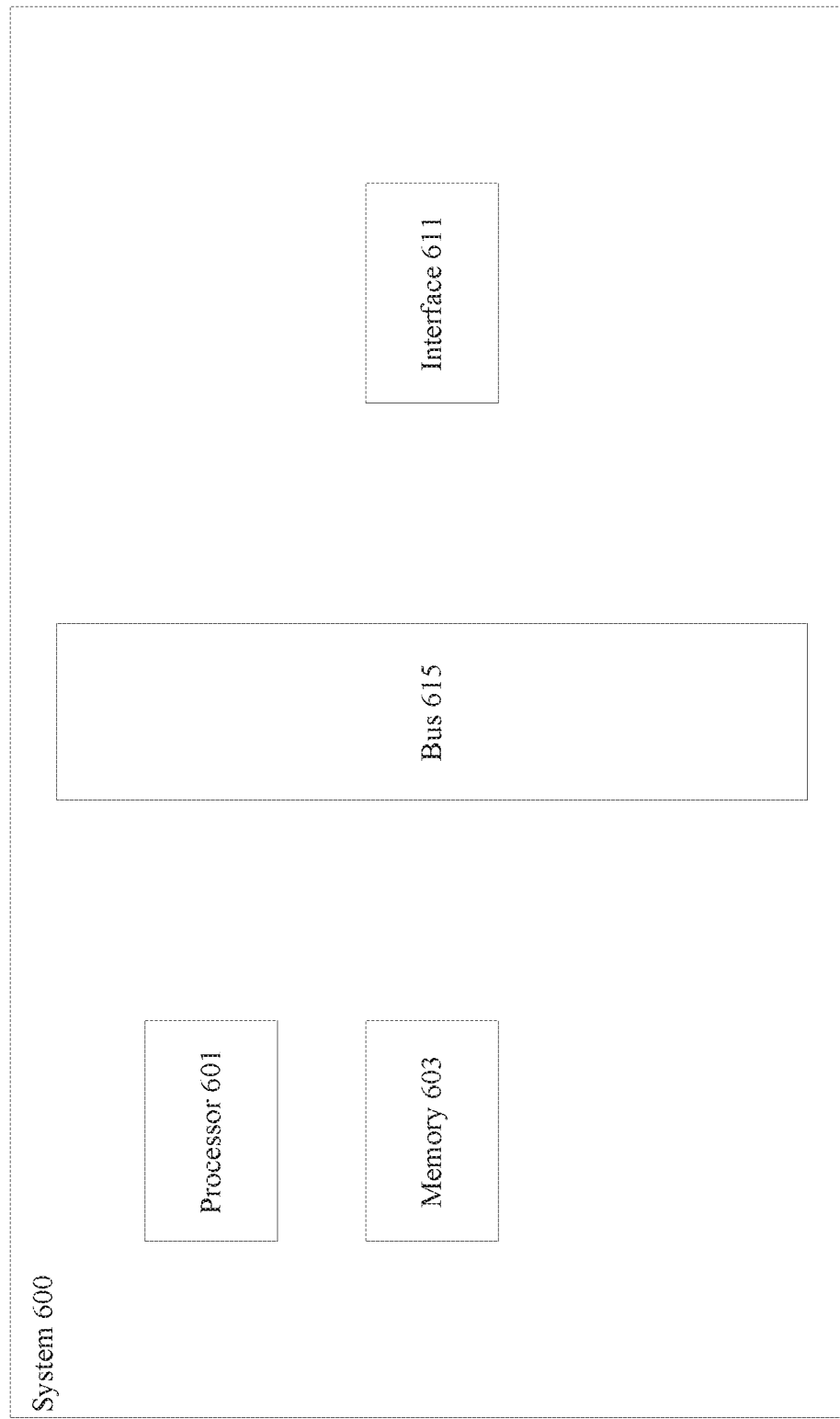
FIG. 6 illustrates one example of a system capable of implementing various processes described in the present disclosure, in accordance with one or more embodiments.

FIG. 6 illustrates one example of a system 600 capable of implementing various processes described in the present disclosure, in accordance with one or more embodiments. In some embodiments, system 600 is a client device, such as client device 102-108. In other embodiments, system 600 is a server device, such as server 112 and/or server 114. In some embodiments, the server device is a content server and/or a dispatch server, as described in FIGS. 2A-2C and FIGS. 4A-4E. In an alternative embodiment, the content server and dispatch server comprise a single server device in system architecture 100 that is configured to perform the operations of both servers.

According to particular embodiments, a system 600, suitable for implementing particular embodiments of the present disclosure, includes a processor 601, a memory 603, an interface 611, and a bus 615 (e.g., a PCI bus or other interconnection fabric) and operates as a streaming server. In some embodiments, when acting under the control of appropriate software or firmware, the processor 601 is responsible for processing inputs through various computational layers and algorithms to extract condition information from images and other data. In other embodiments, the processor 601 is responsible for transmitting and/or receiving one or more data packets (as in steps 203, 205, 211, 213, 401, and 403), authenticate one or more user devices (as in steps 207), authorize one or more client devices to access data (as in step 209), update and/or integrate stored data (as in step 217), retrieve data from memory (as in step 219), implement a weighting algorithm (such as algorithm 245), generating a transmission request and/or receipt packet, and/or calculating match scores and/or ratings (such as in steps 407, 409, and 411). In other embodiments, the processor 401 is additionally, or alternatively, responsible for transmitting a call to action item (as in step 205) and/or transmitting a review confirmation (as in step 203). Various specially configured devices can also be used in place of a processor 601 or in addition to processor 601.

The interface 611 is typically configured to send and receive data packets or data segments over a network, such as network 104. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions. In some embodiments data stored in memory 603 comprises an organizational database, such as database 116, of unique identifiers corresponding to user profiles. In some embodiments, data stored in memory 603 additionally, or alternatively, includes network profile information 223, validation information 241, and/or other stored validation information 243. In some embodiments, the stored program instructions include program instructions for operations including storing network profile information 223, such as in step 201, receiving one or more data packets 233, such as in step 203, transmitting a call to action item 235, such as in step 205, authenticate a user with a corresponding unique identifier 239, such as in step 207, authorize a client device to access network profile information 223, such as in step 209, receive validation information 241, such as in step 211, transmit a review confirmation, such as in step 213, storing validation information 241 in an array of a data structure, such as in step 215, and/or updating a deserialized data structure, such as in step 217. In some embodiments, the stored program instructions additionally, or alternatively, include program instructions for operations including assigning weighted scores to one or more data items of the validation information based on predetermined criterion, integrating the one or more weighted data items with the user data of the network profile information based on predetermined protocols, aggregating the stored validation information 241 with other stored validation information 243 received from a plurality of other client devices, and/or calculating match scores 455 and 457 and/or ratings 459. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 7:
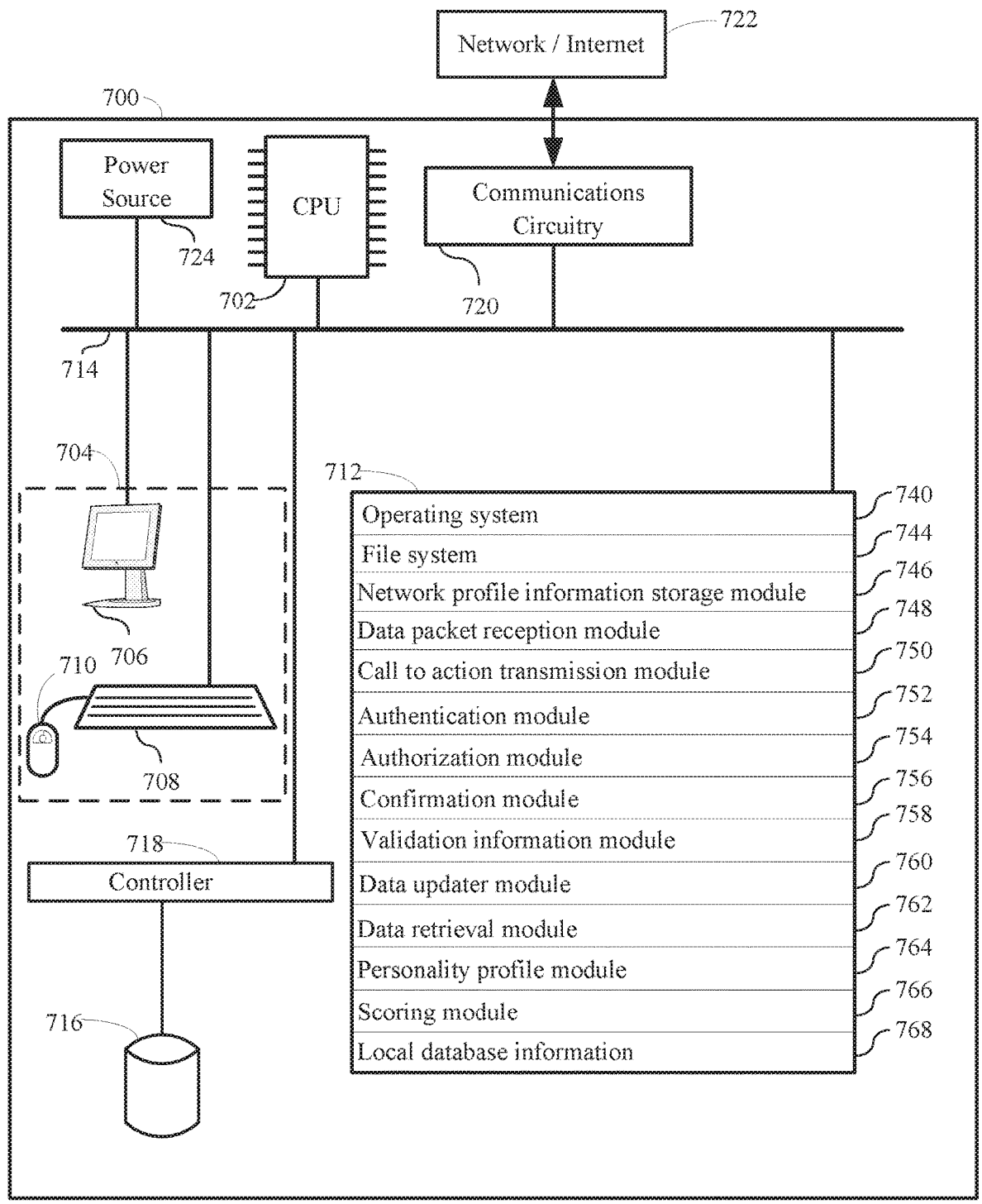
FIG. 7 is a block diagram illustrating an example of a computer system capable of implementing various processes described in the present disclosure.

FIG. 7 is a block diagram illustrating an example of a computer system 700 capable of implementing various processes described in the present disclosure. The system 700 typically includes a power source 724; one or more processing units (CPU's) 702 for executing modules, programs and/or instructions stored in memory 712 and thereby performing processing operations; one or more network or other communications circuitry or interfaces 720 for communicating with a network 722; controller 718; and one or more communication buses 714 for interconnecting these components. In some embodiments, network 722 can be the another communication bus, the Internet, an Ethernet, an Intranet, other wide area networks, local area networks, and metropolitan area networks. Communication buses 714 optionally include circuitry (sometimes called a chipset) that interconnects and controls communications between system components. System 700 optionally includes a user interface 704 comprising a display device 706, a keyboard 708, and a mouse 710. In some embodiments, display device 706 may be a touchscreen for displaying and/or inputting information. In some embodiments, system 700 is a server device, such as servers 110 and/or 112. In an alternative embodiment, system 700 is a server device, such as content server 110 and/or dispatch server 112. In an alternative embodiment, the content server 110 and dispatch server 112 is configured in a single system 700 that is configured to perform the operations of both servers.

Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices 716 remotely located from the CPU(s) 702. In some embodiments data stored in one or more storage devices 716 comprise an organizational database, such as database 116, of unique identifiers corresponding to user profiles.

Memory 712, or alternately the non-volatile memory device(s) within memory 712, comprises a non-transitory computer readable storage medium. In some embodiments, memory 712, or the computer readable storage medium of memory 712 stores the following programs, modules and data structures, or a subset thereof:

- an operating system 740 that includes procedures for handling various basic system services and for performing hardware dependent tasks;
- a file system 744 for storing various program files;
- a network profile information storage module 746 for receiving and storing network profile information, such as network profile information 223;
- a data packet reception module 748 for receiving one or more data packets, such as data packets 233;
- a call to action transmission module 750 for generating and/or transmitting a transmission request and/or call to action item 235;
- an authentication module 752 for authenticating client devices, such as the second client device, based on a unique identifier 239 retrieved from an organizational database, such as an organizational database stored on one or more storage devices 716;
- an authorization module 754 for authorizing a client device, such as the second client device, to access network profile information 223;

a confirmation module 756 for generating and/or transmitting a receipt packet and/or review confirmation to a client device, such as the first client device;

a validation information module 758 for receiving validation information 241 from a client device, such as the second client device, and storing such validation information 241 in memory, such as storage device 716;

a data updater module 760 for updating a deserialized data structure, such as in step 217;

a data retrieval module 752 for retrieving aggregated stored validation information 241, such as in step 219;

a personality profile module 764 for computing a user personality profile, such as in method 300, by an algorithm, such as algorithm 243;

a scoring module 766 for calculating a match score, such as first score 455 and 457, and/or a compatibility rating 459; and local database information 768 comprising network profile information 223 and other user information.

Each of the above identified elements may be stored in one or more of the previously mentioned memory devices, and corresponds to a set of instructions for performing a function described above. One or more of the above identified modules my operate by retrieving input from one or more client devices and/or one or more local storage 716 or other databases on network 722, such as database 116. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "system for matching dynamically validated network data," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a presentation generation system and how features are allocated among them will vary from one implementation to another, and may depend in part on the amount of data traffic that the system must handle during peak usage periods as well as during average usage periods.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A system for matching dynamically validated network data, the system comprising:

a first client device corresponding to a first user, the first client device configured to transmit a first set of data packets over a network,
   wherein the first set of data packets include network profile information corresponding to a first network profile of the first user,
   wherein the first network profile includes validated user data corresponding to the first user and user preferences corresponding to the first user;

a second client device corresponding to a second user, the second client device configured to transmit a second set of data packets over the network,
   wherein the second set of data packets include network profile information corresponding to a second network profile of the second user,
   wherein the second network profile includes validated user data corresponding to the second user and user preferences corresponding the second user;

a content server including a processor and memory, the content server configured to:
   receive the first set of data packets and the second set of data packets;
   create a deserialized data structure configured to store the network profile information corresponding to the first network profile and the second network profile, wherein network profile information corresponding to each network profile is stored as a deserialized data structure in the content server,
   wherein validation information corresponding to the validated user data of the network profile information is received from one or more authorized reviewing client devices corresponding to one or more reviewing users, wherein the one or more reviewers has a personal relationship with the first or second user, and stored in one or more arrays of corresponding deserialized data structures, wherein the validation information includes one or more of the following data items: an image including the first or second user and the one or more reviewing users, a relationship type between the first or second user and the one or more reviewing users, a length of the relationship type between the first or second user and the one or more reviewing users, one or more personality traits corresponding to the first or second user including a dominant personality trait, a narration relating to the first or second user, and a verification of attributes of the first or second user listed in each user's respective network profile information; and
   determine:
      a first score between the first network profile and the second network profile based on:
         the user preferences corresponding to the first user, and
         the validated user data corresponding to the second user;
      a second score between the first network profile and the second network profile based on:
         the user preferences corresponding to the second user, and
         the validated user data corresponding to the first user; and
      a compatibility rating for the first network profile and the second network profile, the compatibility rating comprising an average of the first score and the second score, wherein the compatibility rating correlates to a match between the first network profile and the second network profile if all three of the first score, the second score, and the compatibility rating are above a predetermined threshold.

2. The system of claim 1, wherein the first network profile and the second network profile are matched if one or more of the following is greater than a predetermined value:
the first score, the second score, and the compatibility rating.

3. The system of claim 1, wherein the validated user data includes one or more of the following user attributes:
a location, an age, a gender, a desire for children, a body type, a religious belief, one or more personality traits, a personality type, one or more interests, a commitment level, a smoking habit, a height, a relationship status, a number of children, an education level, a salary, and an ethnicity.

4. The system of claim 1, wherein the user preferences include one or more of the following preference attributes:
a preferred distance, a preferred age range, a preferred gender, a preference for children, a preferred body type, a preferred religious belief, one or more preferred personality traits, a preferred personality type, one or more preferred interests, a preferred commitment level, a preference for smoking, a preferred height range, a preferred relationship status, a preference for existing children, a preferred education level, a preferred salary, and a preferred ethnicity.

5. The system of claim 1, wherein the one or more reviewing client devices are authorized by:
receiving one or more data packets from the first client device or the second client device, the one or more data packets including identifying information corresponding to the one or more reviewing users;
authenticating the one or more reviewing users with one or more unique identifiers retrieved from an organizational database, each unique identifier corresponding to a reviewing user, wherein each reviewing user corresponds to a reviewing client device; and
authorizing the one or more reviewing client devices corresponding to the one or more authenticated reviewing users to access network profile information corresponding to a network profile.

6. The system of claim 5, wherein user data is validated by:
receiving, from the one or more authorized reviewing client devices, validation information corresponding to user data of a network profile;
storing the validation information received from each authorized reviewing client device,
wherein validation information corresponding user data of the first network profile is stored as an array of the deserialized data structure corresponding to the first network profile,
wherein validation information corresponding to user data of the second network profile is stored as an array of the deserialized data structure corresponding to the second network profile; and
updating each deserialized data structure by aggregating validation information stored in one or more arrays of the same deserialized data structure.

7. The system of claim 6, wherein the user data is further validated by:
integrating the validated user data of the first network profile with the aggregated validation information stored as an array in the deserialized data structure corresponding to the first network profile; and
integrating the validated user data of the second network profile with aggregated validation information stored as an array in the deserialized data structure corresponding to the second network profile.

8. A method for matching dynamically validated network data, the method comprising:
receiving, at a content server, a first set of data packets from a first client device corresponding to a first user, the first client device configured to transmit the first set of data packets over a network,
wherein the first set of data packets include network profile information corresponding to a first network profile of the first user,
wherein the first network profile includes validated user data corresponding to the first user and user preferences corresponding to the first user;
receiving, at the content server, a second set of data packets from a second client device corresponding to a second user, the second client device configured to transmit the second set of data packets over the network,
wherein the second set of data packets include network profile information corresponding to a second network profile of the second user,
wherein the second network profile includes validated user data corresponding to the second user and user preferences corresponding the second user;
creating a deserialized data structure configured for storing the network profile information corresponding to the first network profile and the second network profile at the content server,
wherein network profile information corresponding to each network profile is stored as a deserialized data structure in the content server,
wherein validation information corresponding to validated user data of the network profile information is received from one or more authorized reviewing client devices corresponding to one or more reviewing users, wherein the one or more reviewers has a personal relationship with the first or second user, and stored in one or more arrays of corresponding deserialized data structures, wherein the validation information includes one or more of the following data items: an image including the first or second user and the one or more reviewing users, a relationship type between the first or second user and the one or more reviewing users, a length of the relationship type between the first or second user and the one or more reviewing users, one or more personality traits corresponding to the first or second user including a dominant personality trait, a narration relating to the first or second user, and a verification of attributes of the first or second user listed in each user's respective network profile information;
calculating a first score between the first network profile and the second network profile based on:
the user preferences corresponding to the first user, and
the validated user data corresponding to the second user;
calculating a second score between the first network profile and the second network profile based on:
the user preferences corresponding to the second user, and
the validated user data corresponding to the first user; and
calculating a compatibility rating for the first network profile and the second network profile, the compatibility rating comprising an average of the first score and the second score, wherein the compatibility rating correlates to a match between the first network profile and the second network profile if all three of the first score, the second score, and the compatibility rating are above a predetermined threshold.

9. The method of claim 8, further comprising matching the first network profile and the second network profile if one or more of the following is greater than a predetermined value:
the first score, the second score, and the compatibility rating.

10. The method of claim 8, wherein the validated user data includes one or more of the following user attributes:
a location, an age, a gender, a desire for children, a body type, a religious belief, one or more personality traits, a personality type, one or more interests, a commitment level, a smoking habit, a height, a relationship status, a number of children, an education level, a salary, and an ethnicity.

11. The method of claim 8, wherein the user preferences include one or more of the following preference attributes:
a preferred distance, a preferred age range, a preferred gender, a preference for children, a preferred body type, a preferred religious belief, one or more preferred personality traits, a preferred personality type, one or more preferred interests, a preferred commitment level, a preference for smoking, a preferred height range, a preferred relationship status, a preference for existing children, a preferred education level, a preferred salary, and a preferred ethnicity.

12. The method of claim 8, wherein the one or more reviewing client devices are authorized by:
receiving one or more data packets from the first client device or the second client device, the one or more data packets including identifying information corresponding to the one or more reviewing users;
authenticating the one or more reviewing users with one or more unique identifiers retrieved from an organizational database, each unique identifier corresponding to a reviewing user, wherein each reviewing user corresponds to a reviewing client device; and
authorizing the one or more reviewing client devices corresponding to the one or more authenticated reviewing users to access network profile information corresponding to a network profile.

13. The method of claim 12, wherein user data is validated by:
receiving, from the one or more authorized reviewing client devices, validation information corresponding to user data of a network profile;
storing the validation information received from each authorized reviewing client device,
wherein validation information corresponding to user data of the first network profile is stored as an array of the deserialized data structure corresponding to the first network profile,
wherein validation information corresponding to user data of the second network profile is stored as an array of the deserialized data structure corresponding to the second network profile; and
updating each deserialized data structure by aggregating validation information stored in one or more arrays of the same deserialized data structure.

14. The method of claim 13, wherein the user data is further validated by:

integrating the validated user data of the first network profile with the aggregated validation information stored as an array in the deserialized data structure corresponding to the first network profile; and
integrating the validated user data of the second network profile with aggregated validation information stored as an array in the deserialized data structure corresponding to the second network profile.

15. A non-transitory computer readable medium comprising one or more programs configured for execution by a computer system, the one or more programs including instructions for:
receiving, at a content server, a first set of data packets from a first client device corresponding to a first user, the first client device configured to transmit the first set of data packets over a network,
wherein the first set of data packets include network profile information corresponding to a first network profile of the first user,
wherein the first network profile includes validated user data corresponding to the first user and user preferences corresponding to the first user;
receiving, at the content server, a second set of data packets from a second client device corresponding to a second user, the second client device configured to transmit the second set of data packets over the network,
wherein the second set of data packets include network profile information corresponding to a second network profile of the second user,
wherein the second network profile includes validated user data corresponding to the second user and user preferences corresponding the second user;
creating a deserialized data structure configured for storing the network profile information corresponding to the first network profile and the second network profile at the content server,
wherein network profile information corresponding to each network profile is stored as a deserialized data structure in the content server,
wherein validation information corresponding to validated user data of the network profile information is received from one or more authorized reviewing client devices corresponding to one or more reviewing users, wherein the one or more reviewers has a personal relationship with the first or second user, and stored in one or more arrays of corresponding deserialized data structures, wherein the validation information includes one or more of the following data items: an image including the first or second user and the one or more reviewing users, a relationship type between the first or second user and the one or more reviewing users, a length of the relationship type between the first or second user and the one or more reviewing users, one or more personality traits corresponding to the first or second user including a dominant personality trait, a narration relating to the first or second user, and a verification of attributes of the first or second user listed in each user's respective network profile information;
calculating a first score between the first network profile and the second network profile based on:
the user preferences corresponding to the first user, and the validated user data corresponding to the second user;
calculating a second score between the first network profile and the second network profile based on:

the user preferences corresponding to the second user, and the validated user data corresponding to the first user; and calculating a compatibility rating for the first network profile and the second network profile, the compatibility rating comprising an average of the first score and the second score, wherein the compatibility rating correlates to a match between the first network profile and the second network profile if all three of the first score, the second score, and the compatibility rating are above a predetermined threshold.

16. The non-transitory computer readable medium of claim 15, wherein the one or more programs further include instructions for matching the first network profile and the second network profile if one or more of the following is greater than a predetermined value:

the first score, the second score, and the compatibility rating.

17. The non-transitory computer readable medium of claim 15, wherein the user preferences include one or more of the following preference attributes:

a preferred distance, a preferred age range, a preferred gender, a preference for children, a preferred body type, a preferred religious belief, one or more preferred personality traits, a preferred personality type, one or more preferred interests, a preferred commitment level, a preference for smoking, a preferred height range, a preferred relationship status, a preference for existing children, a preferred education level, a preferred salary, and a preferred ethnicity.

18. The non-transitory computer readable medium of claim 15, wherein the one or more reviewing client devices are authorized by:

receiving one or more data packets from the first client device or the second client device, the one or more data packets including identifying information corresponding to the one or more reviewing users;

authenticating the one or more reviewing users with one or more unique identifiers retrieved from an organizational database, each unique identifier corresponding to a reviewing user, wherein each reviewing user corresponds to a reviewing client device; and authorizing the one or more reviewing client devices corresponding to the one or more authenticated reviewing users to access network profile information corresponding to a network profile.

19. The non-transitory computer readable medium of claim 18, wherein user data is validated by:

receiving, from the one or more authorized reviewing client devices, validation information corresponding to user data of a network profile;

storing the validation information received from each authorized reviewing client device, wherein validation information corresponding to user data of the first network profile is stored as an array of the deserialized data structure corresponding to the first network profile, wherein validation information corresponding to user data of the second network profile is stored as an array of the deserialized data structure corresponding to the second network profile; and updating each deserialized data structure by aggregating validation information stored in one or more arrays of the same deserialized data structure.

20. The non-transitory computer readable medium of claim 19, wherein the user data is further validated by:

integrating the validated user data of the first network profile with the aggregated validation information stored as an array in the deserialized data structure corresponding to the first network profile; and integrating the validated user data of the second network profile with aggregated validation information stored as an array in the deserialized data structure corresponding to the second network profile.

* * * * *